United States Patent
Tao et al.

(10) Patent No.: US 12,490,224 B2
(45) Date of Patent: Dec. 2, 2025

(54) LOCATION MEASUREMENT COMMUNICATION METHOD AND COMMUNICATION APPARATUS

(71) Applicant: Huawei Technologies Co., Ltd., Guangdong (CN)

(72) Inventors: Zhenyu Tao, Shanghai (CN); Kan Zeng, Beijing (CN); Qingfen Liu, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 355 days.

(21) Appl. No.: 18/308,255

(22) Filed: Apr. 27, 2023

(65) Prior Publication Data

US 2023/0269698 A1    Aug. 24, 2023

Related U.S. Application Data

(63) Continuation of application No. PCT/CN2021/127755, filed on Oct. 30, 2021.

(30) Foreign Application Priority Data

Oct. 31, 2020  (CN) .......................... 202011196765.9

(51) Int. Cl.
  *H04W 64/00* (2009.01)
  *H04W 24/10* (2009.01)

(52) U.S. Cl.
  CPC ........... *H04W 64/00* (2013.01); *H04W 24/10* (2013.01)

(58) Field of Classification Search
  None
  See application file for complete search history.

(56) References Cited

U.S. PATENT DOCUMENTS

| | | |
|---|---|---|
| 2018/0199160 A1 | 7/2018 | Edge |
| 2019/0053010 A1 | 2/2019 | Edge et al. |
| 2020/0037283 A1 | 1/2020 | Edge et al. |
| 2020/0053686 A1 | 2/2020 | Edge et al. |
| 2020/0092776 A1 | 3/2020 | Edge |

FOREIGN PATENT DOCUMENTS

| | | |
|---|---|---|
| CN | 105721845 A | 6/2016 |
| CN | 110830794 A | 2/2020 |

OTHER PUBLICATIONS

Qualcomm Incorporated; Location Services Alternatives for SG System Architecture and SG Procedures; S2-170819; Feb. 13-17, 2017; 2017; SA WG2 Meeting #119; pp. 1-20. (Year: 2017).*

(Continued)

*Primary Examiner* — Adolf Dsouza
(74) *Attorney, Agent, or Firm* — WOMBLE BOND DICKINSON (US) LLP

(57) ABSTRACT

A location measurement method includes: sending a first message to an access and mobility management network element, where the first message includes first information associated with a terminal, and the first message indicates to perform location measurement on the terminal; and receiving a second message sent by the access and mobility management network element, where the second message includes second information associated with the terminal and location measurement information of the terminal.

20 Claims, 16 Drawing Sheets

(56) References Cited

OTHER PUBLICATIONS

SA WG2 Meeting #119 S2-170819 "Location Services Alternatives for 5G System Architecture and 5G Procedures",Qualcomm Incorporated,Feb. 13-17, 2017,Dubrovnik,Croatia,total 21 pages.
3GPP TR 23.731 V16.0.0 (Dec. 2018) 3rd Generation Partnership Project;Technical Specification Group Services and System Aspects;Study on Enhancement to the 5GC Location Services (Release 16),total 170 pages,XP051591219.
SA WG2 Meeting #122-BIS,S2-175716 5G System Procedures for Location Support of Regulatory Services,Qualcomm Incorporated,Aug 21-35, 2017,Sophia Antipolis,FR,total 22 pages.
3GPP TS 23.273 V16.4.0 (Jul. 2020) 3rd Generation Partnership Project;Technical Specification Group Services and System Aspects;5G System (5GS) Location Services (LCS);Stage 2 (Release 16),total 96 pages,XP051924373.

\* cited by examiner

LOCATION MEASUREMENT COMMUNICATION METHOD AND COMMUNICATION APPARATUS

CROSS-REFERENCE TO RELATED APPLICATIONS

This application is a continuation of International Application No. PCT/CN2021/127755, filed on Oct. 30, 2021, which claims priority to Chinese Patent Application No. 202011196765.9, filed on Oct. 31, 2020. The disclosures of the aforementioned applications are incorporated herein by reference in these entireties.

TECHNICAL FIELD

This application relates to the field of communication technologies, and in particular, to a communication method and a communication apparatus.

BACKGROUND

An existing network assisted location positioning procedure includes two sub-procedures: a network assisted positioning procedure and a procedure for obtaining nonterminal-associated network assistance data. In the network assisted positioning procedure, a radio access network (RAN) device, such as a base station, providing a service for a terminal configures measurement logic for location measurement of the terminal, and sends configuration information to a location management function (LMF) network element. The configuration information includes, for example, a frequency to be measured, a time period, and a neighboring-cell RAN device that needs to participate in the location measurement of the terminal. In the procedure for obtaining nonterminal-associated network assistance data, the LMF sends signaling based on the configuration information; specifies one or more RAN devices via an access and mobility management function (AMF) network element to obtain location-associated data of the terminal through measurement; and calculates location information of the terminal based on location measurement information fed back by the RAN devices participating in measurement.

However, in an existing procedure for obtaining nonterminal-associated network assistance data, the LMF can obtain, at a same moment, location measurement information of only one terminal served by a base station, but cannot concurrently perform location measurement on another terminal served by the base station.

SUMMARY

This application provides a communication method and a communication apparatus, to resolve a problem that when obtaining location measurement information of a terminal served by a base station, an LMF cannot concurrently perform location measurement on another terminal served by the base station.

In some embodiments, this application provides a communication method applied to a location management function network element. The method includes: sending a first message to an access and mobility management network element, where the first message includes first information associated with a terminal, and the first message indicates to perform location measurement on the terminal; and receiving a second message sent by the access and mobility management network element, where the second message includes second information associated with the terminal and location measurement information of the terminal.

In this method, a message sent between the location management function network element and the access and mobility management network element includes information associated with the terminal. In this way, the location management function network element and the access and mobility management network element can determine the corresponding terminal directly based on a received message. Therefore, when a location measurement-related message corresponding to a terminal is sent between the location management function network element and the access and mobility management network element, a location measurement-related message corresponding to another terminal can also be sent concurrently. As a result, the LMF can concurrently obtain location measurement information of multiple terminals served by a same base station.

In some embodiments, the method is applied to a procedure in which the location management function network element and a radio access network device obtain the location measurement information of the terminal.

In some embodiments, the first message is N1/N2 interface communication message transfer signaling, and the second message is N2 interface communication message notification signaling. The N1/N2 interface is a pair of interfaces that connect different network functions in a 5G system. The N1 interface is the interface between the 5G radio access network (RAN) and the core network. It is used for the transmission of user data and control information between the radio access network and the core network functions. The N2 interface is the interface between different network functions within the 5G core network and is used for the transmission of control information between the various core network functions, such as between a session management function (SMF) and the access and mobility management function (AMF).

In this method, for information associated with the terminal, an identifier of the to-be-positioned terminal may be included in the N1/N2 interface communication message transfer signaling and the N2 interface communication message notification signaling. In this way, the location management function network element and the access and mobility management network element can quickly and efficiently determine the to-be-positioned object directly based on the first message and the second message. Therefore, when a location measurement-related message corresponding to a terminal is sent between the location management function network element and the access and mobility management network element, a location measurement-related message corresponding to another terminal can also be sent concurrently. As a result, the LMF can concurrently obtain location measurement information of multiple terminals served by a same base station.

In some embodiments, the first message is nonterminal-associated N2 interface communication message transfer signaling, and the second message is nonterminal-associated N2 interface communication message notification signaling.

In this method, terminal-associated information carried in existing signaling in a procedure for obtaining nonterminal-associated network assistance data is obtained, which can adapt to an execution process of an existing procedure.

In some embodiments, before sending the first message to the access and mobility management network element, the method further includes: sending a third message to the access and mobility management network element, where the third message is used to subscribe to the location measurement information; and receiving a fourth message sent by the access and mobility management network element, where the fourth message is used to notify that subscription to the location measurement information is successful.

In some embodiments, the third message is N1/N2 interface communication message subscription request signaling, and the fourth message is N1/N2 interface communication message subscription response signaling.

In this method, the N1/N2 interface communication message subscription request signaling includes the identifier of the to-be-positioned terminal. The N1/N2 interface communication message subscription response signaling includes a subscription identifier corresponding to the N1/N2 interface communication message subscription request signaling. Therefore, the subscription identifier also corresponds to the identifier of the terminal. In this way, the location management function network element and the access and mobility management network element can quickly and efficiently determine the to-be-positioned object directly based on the third message. Therefore, when subscribing to location measurement information corresponding to a terminal from the access and mobility management network element, the location management function network element can concurrently subscribe to location measurement information corresponding to another terminal. As a result, the LMF can concurrently obtain location measurement information of multiple terminals served by a same base station.

In some embodiments, the third message is nonterminal-associated communication message subscription request signaling, and the fourth message is nonterminal-associated communication message subscription response signaling.

In this method, terminal-associated information carried in existing signaling in a procedure for obtaining nonterminal-associated network assistance data is obtained, which can adapt to an execution process of an existing procedure.

In some embodiments, the third message includes the first information, and the fourth message includes the second information.

In this method, the first information and the second information are associated with the terminal. In this way, the location management function network element and the access and mobility management network element can quickly and efficiently determine the to-be-positioned object directly based on the third message and the fourth message. Therefore, when subscribing to location measurement information corresponding to a terminal from the access and mobility management network element, the location management function network element can concurrently subscribe to location measurement information corresponding to another terminal. As a result, the LMF can concurrently obtain location measurement information of multiple terminals served by a same base station.

In some embodiments, the first information includes a terminal identifier, a routing identifier, a location service correlation identifier, or an N2 interface notification subscription identifier.

In some embodiments, the second information includes a terminal identifier, a routing identifier, a location service correlation identifier, or an N2 interface notification subscription identifier.

In some embodiments, this application provides a communication method, applied to an access and mobility management network element. The method includes: receiving a first message sent by a location management function network element, where the first message includes first information associated with a terminal, and the first message indicates to perform location measurement on the terminal; sending a fifth message to a radio access network device, where the fifth message includes third information associated with the terminal, and the fifth message indicates to perform location measurement on the terminal; receiving a sixth message sent by the radio access network device, where the sixth message includes the third information and location measurement information of the terminal; and sending a second message to the location management function network element, where the second message includes second information associated with the terminal and the location measurement information.

In this method, a message sent between the location management function network element and the access and mobility management network element and a message sent between the access and mobility management network element and the radio access network device include information associated with the terminal. In this way, the location management function network element, the access and mobility management network element, and the radio access network device can determine the corresponding terminal directly based on a received message. Therefore, when a location measurement-related message corresponding to a terminal is sent among the location management function network element, the access and mobility management network element, and the radio access network device, a location measurement-related message corresponding to another terminal can also be sent concurrently. As a result, the LMF can concurrently obtain location measurement information of multiple terminals served by a same base station.

In some embodiments, the method is applied to a procedure in which the location management function network element and the radio access network device obtain the location measurement information of the terminal.

In some embodiments, the first message is N1/N2 interface communication message transfer signaling, and the second message is N2 interface communication message notification signaling.

In some embodiments, the first message is nonterminal-associated N2 interface communication message transfer signaling, and the second message is nonterminal-associated N2 interface communication message notification signaling.

In some embodiments, the fifth message is terminal-associated new radio positioning protocol annex downlink transport signaling, and the sixth message is terminal-associated new radio positioning protocol annex uplink transport signaling.

In this method, the terminal-associated new radio positioning protocol annex downlink transport signaling and the terminal-associated new radio positioning protocol annex uplink transport signaling include the identifier of the to-be-positioned terminal. In this way, the access and mobility management network element and the radio access network device can quickly and efficiently determine the to-be-positioned object directly based on the fifth message and the sixth message. Therefore, when a location measurement-related message corresponding to a terminal is sent between the access and mobility management network element and the radio access network device, a location measurement-related message corresponding to another terminal can also be sent concurrently. As a result, the LMF can concurrently obtain location measurement information of multiple terminals served by a same base station.

In some embodiments, the fifth message is nonterminal-associated new radio positioning protocol annex downlink transport signaling, and the sixth message is nonterminal-associated new radio positioning protocol annex uplink transport signaling.

In this method, terminal-associated information carried in existing signaling in a procedure for obtaining nonterminal-associated network assistance data is obtained, which can adapt to an execution process of an existing procedure.

In some embodiments, before receiving the first message from the location management function network element, the method further includes: receiving a third message from the location management function network element, where the fourth message is used to subscribe to the location measurement information; and sending a fourth message to the location management function network element, where the fourth message is used to notify that subscription to the location measurement information is successful.

In some embodiments, the third message is N1/N2 interface communication message subscription request signaling, and the fourth message is N1/N2 interface communication message subscription response signaling.

In some embodiments, the third message is nonterminal-associated communication message subscription request signaling, and the fourth message is nonterminal-associated communication message subscription response signaling.

In some embodiments, the third message includes the first information, and the fourth message includes the second information.

In some embodiments, the first information includes a terminal identifier, a routing identifier, a location service correlation identifier, or an N2 interface notification subscription identifier.

In some embodiments, the second information includes a terminal identifier, a routing identifier, a location service correlation identifier, or an N2 interface notification subscription identifier.

In some embodiments, the third information includes a terminal identifier, a routing identifier, a location service correlation identifier, or an N2 interface notification subscription identifier.

In some embodiments, this application provides a communication method, applied to a radio access network device. The method includes: receiving a fifth message from an access and mobility management network element, where the fifth message includes third information associated with a terminal, and the fifth message indicates to perform location measurement on the terminal; and sending a sixth message to the access and mobility management network element, where the sixth message includes the third information and location measurement information of the terminal.

In this method, a message sent between a location management function network element and the access and mobility management network element and a message sent between the access and mobility management network element and the radio access network device include information associated with the terminal. In this way, the access and mobility management network element and the radio access network device can directly determine the corresponding terminal based on a received message. Therefore, when a location measurement-related message corresponding to a terminal is sent between the access and mobility management network element and the radio access network device, a location measurement-related message corresponding to another terminal can also be sent concurrently. As a result, the LMF can concurrently obtain location measurement information of multiple terminals served by a same base station.

In some embodiments, the method is applied to a procedure in which the location management function network element and the radio access network device obtain the location measurement information of the terminal.

In some embodiments, the fifth message is terminal-associated new radio positioning protocol annex downlink transport signaling, and the sixth message is terminal-associated new radio positioning protocol annex uplink transport signaling.

In some embodiments, the fifth message is nonterminal-associated new radio positioning protocol annex downlink transport signaling, and the sixth message is nonterminal-associated new radio positioning protocol annex uplink transport signaling.

In some embodiments, the third information includes a subscription permanent identifier, a generic public subscription identifier, a permanent equipment identifier, a routing identifier, a temporary identifier allocated by the location management function network element to the terminal, a temporary identifier allocated by the access and mobility management network element to the terminal, or a temporary identifier allocated by the radio access network device to the terminal.

In some embodiments, this application provides a communication apparatus, applied to a location management function network element and including a sending unit and a receiving unit. The sending unit is configured to send a first message to an access and mobility management network element, where the first message includes first information associated with a terminal, and the first message indicates to perform location measurement on the terminal. The receiving unit is configured to receive a second message sent by the access and mobility management network element, where the second message includes second information associated with the terminal and location measurement information of the terminal.

In some embodiments, the communication apparatus is applied to a procedure in which the location management function network element and a radio access network device obtain the location measurement information of the terminal.

In some embodiments, the first message is N1/N2 interface communication message transfer signaling, and the second message is N2 interface communication message notification signaling.

In some embodiments, the first message is nonterminal-associated N2 interface communication message transfer signaling, and the second message is nonterminal-associated N2 interface communication message notification signaling.

In some embodiments, before the sending unit sends the first message to the access and mobility management network element, the sending unit is further configured to send a third message to the access and mobility management network element, where the third message is used to subscribe to the location measurement information. The receiving unit is further configured to receive a fourth message sent by the access and mobility management network element, where the fourth message is used to notify that subscription to the location measurement information is successful.

In some embodiments, the third message is N1/N2 interface communication message subscription request signaling, and the fourth message is N1/N2 interface communication message subscription response signaling.

In some embodiments, the third message is nonterminal-associated communication message subscription request signaling, and the fourth message is nonterminal-associated communication message subscription response signaling.

In some embodiments, the third message includes the first information, and the fourth message includes the second information.

In some embodiments, the first information includes a terminal identifier, a routing identifier, a location service correlation identifier, or an N2 interface notification subscription identifier.

In some embodiments, the second information includes a terminal identifier, a routing identifier, a location service correlation identifier, or an N2 interface notification subscription identifier.

In some embodiments, this application provides a communication apparatus, applied to an access and mobility management network element and including a sending unit and a receiving unit. The receiving unit is configured to receive a first message sent by a location management function network element, where the first message includes first information associated with a terminal, and the first message indicates to perform location measurement on the terminal. The sending unit is configured to send a fifth message to a radio access network device, where the fifth message includes third information associated with the terminal, and the fifth message indicates to perform location measurement on the terminal. The receiving unit is further configured to receive a sixth message sent by the radio access network device, where the sixth message includes the third information and location measurement information of the terminal. The sending unit is further configured to send a second message to the location management function network element, where the second message includes second information associated with the terminal and the location measurement information.

In some embodiments, the communication apparatus is applied to a procedure in which the location management function network element and the radio access network device obtain the location measurement information of the terminal.

In some embodiments, the first message is N1/N2 interface communication message transfer signaling, and the second message is N2 interface communication message notification signaling.

In some embodiments, the first message is nonterminal-associated N2 interface communication message transfer signaling, and the second message is nonterminal-associated N2 interface communication message notification signaling.

In some embodiments, the fifth message is terminal-associated new radio positioning protocol annex downlink transport signaling, and the sixth message is terminal-associated new radio positioning protocol annex uplink transport signaling.

In some embodiments, the fifth message is nonterminal-associated new radio positioning protocol annex downlink transport signaling, and the sixth message is nonterminal-associated new radio positioning protocol annex uplink transport signaling.

In some embodiments, before the receiving unit receives the first message from the location management function network element, the receiving unit is further configured to receive a third message from the location management function network element, where the fourth message is used to subscribe to the location measurement information. The sending unit is further configured to send a fourth message to the location management function network element, where the fourth message is used to notify that subscription to the location measurement information is successful.

In some embodiments, the third message is N1/N2 interface communication message subscription request signaling, and the fourth message is N1/N2 interface communication message subscription response signaling.

In some embodiments, the third message is nonterminal-associated communication message subscription request signaling, and the fourth message is nonterminal-associated communication message subscription response signaling.

In some embodiments, the third message includes the first information, and the fourth message includes the second information.

In some embodiments, the first information includes a terminal identifier, a routing identifier, a location service correlation identifier, or an N2 interface notification subscription identifier.

In some embodiments, the second information includes a terminal identifier, a routing identifier, a location service correlation identifier, or an N2 interface notification subscription identifier.

In some embodiments, the third information includes a terminal identifier, a routing identifier, a location service correlation identifier, or an N2 interface notification subscription identifier.

In some embodiments, this application provides a communication apparatus, applied to a radio access network device and including a sending unit and a receiving unit. The receiving unit is configured to receive a fifth message from an access and mobility management network element, where the fifth message includes third information associated with a terminal, and the fifth message indicates to perform location measurement on the terminal. The sending unit is configured to send a sixth message to the access and mobility management network element, where the sixth message includes the third information and location measurement information of the terminal.

In some embodiments, the communication apparatus is applied to a procedure in which a location management function network element and the radio access network device obtain the location measurement information of the terminal.

In some embodiments, the fifth message is terminal-associated new radio positioning protocol annex downlink transport signaling, and the sixth message is terminal-associated new radio positioning protocol annex uplink transport signaling.

In some embodiments, the fifth message is nonterminal-associated new radio positioning protocol annex downlink transport signaling, and the sixth message is nonterminal-associated new radio positioning protocol annex uplink transport signaling.

In some embodiments, the third information includes a subscription permanent identifier, a generic public subscription identifier, a permanent equipment identifier, a routing identifier, a temporary identifier allocated by the location management function network element to the terminal, a temporary identifier allocated by the access and mobility management network element to the terminal, or a temporary identifier allocated by the radio access network device to the terminal.

In some embodiments, this application provides a communication apparatus, applied to a location management function network element and including at least one processor, and a memory and a communication interface that are communicatively connected to the at least one processor. The communication interface is configured to: receive a signal from another communication apparatus other than the communication apparatus and transmit the signal to the processor, or send a signal from the processor to another communication apparatus other than the communication apparatus. The memory stores instructions that can be executed by the at least one processor, and the at least one processor executes the instructions stored in the memory to enable the communication apparatus to perform any method in some embodiments described herein.

In some embodiments, this application provides a communication apparatus, applied to an access and mobility management network element and including at least one processor, and a memory and a communication interface that are communicatively connected to the at least one processor. The communication interface is configured to: receive a signal from another communication apparatus other than the communication apparatus and transmit the signal to the processor, or send a signal from the processor to another communication apparatus other than the communication apparatus. The memory stores instructions that can be executed by the at least one processor, and the at least one processor executes the instructions stored in the memory to enable the communication apparatus to perform any method in some embodiments described herein.

In some embodiments, this application provides a communication apparatus, applied to a radio access network device and including at least one processor, and a memory and a communication interface that are communicatively connected to the at least one processor. The communication interface is configured to: receive a signal from another communication apparatus other than the communication apparatus and transmit the signal to the processor, or send a signal from the processor to another communication apparatus other than the communication apparatus. The memory stores instructions that can be executed by the at least one processor, and the at least one processor executes the instructions stored in the memory to enable the communication apparatus to perform any method in some embodiments described herein.

In some embodiments, this application provides a communication system, where the communication system includes a communication apparatus configured to perform methods discussed herein.

In some embodiments, the communication system further includes a communication apparatus configured to perform methods discussed herein.

In some embodiments, this application provides a computer-readable storage medium. The computer-readable storage medium stores a computer program or instructions. When the computer program is run on a computer or the instructions are executed on a computer, the computer is enabled to perform methods discussed herein.

In some embodiments, this application provides a computer program product, where the computer program product includes a computer program or instructions. When a computer reads and executes the computer program product, the computer is enabled to perform the methods discussed herein.

In some embodiments, this application provides a chip, where the chip includes a processor. The processor is coupled to a memory, and is configured to read and execute a software program stored in the memory, to perform methods discussed herein.

DESCRIPTION OF EMBODIMENTS

Figure 1A:
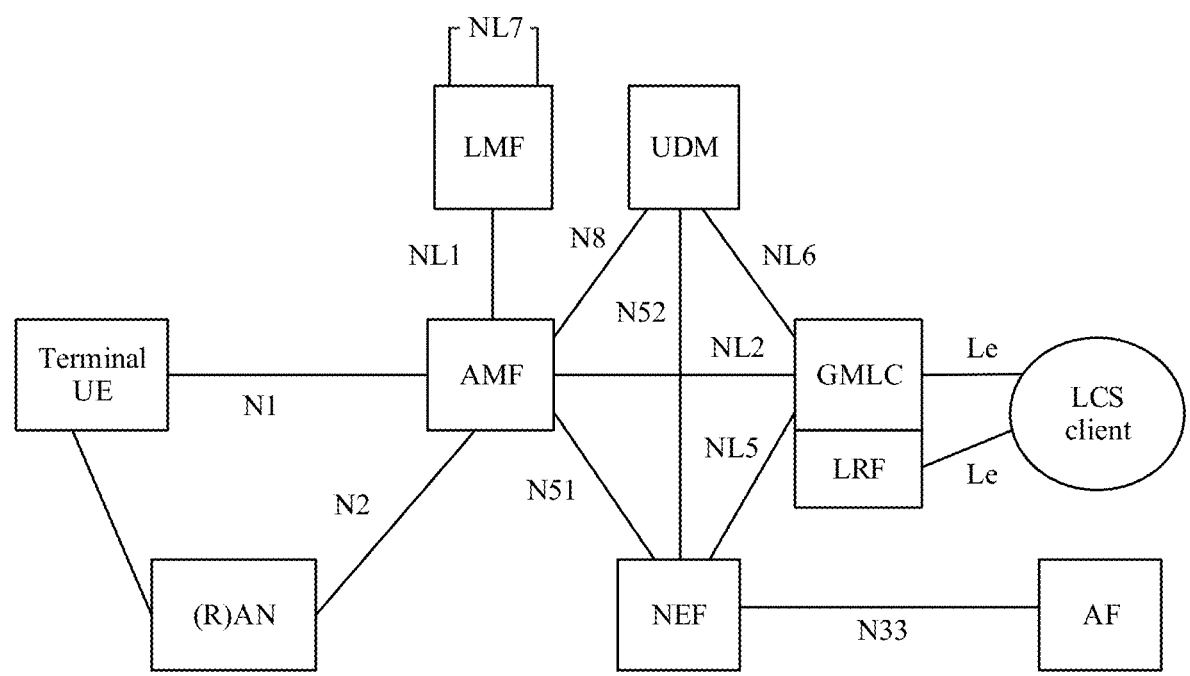
FIG. 1*a* is a schematic diagram of a communication architecture according to an embodiment of this application.

The following describes in detail embodiments of this application with reference to accompanying drawings.

The method and the device are based on a same technical concept, and principles used by the method and the device to resolve problems are similar. Therefore, mutual reference may be made between implementation of the device and implementation of the method. Repeated parts are not described.

The following describes some terms in this application to help persons skilled in the art have a better understanding.

(1) A terminal in embodiments of this application may also be referred to as a terminal device, user equipment (UE), a mobile station (MS), a mobile terminal (MT), or the like. The terminal is an entity configured to receive or transmit a signal on a user side, and is configured to send an uplink signal to a network device or receive a downlink signal from a network device. The terminal may be a device that provides voice and/or data connectivity for a user.

For example, the terminal device may be a handheld device with a wireless connection function, or a processing device connected to a wireless modem. The terminal device may communicate with a core network through a radio access network (RAN), and exchange a voice and/or data with the RAN. The terminal device may include user equipment (UE), a V2X terminal device, a wireless terminal device, a mobile terminal device, a device-to-device D2D) communication terminal device, a machine-to-machine/machine-type communication (M2M/MTC) terminal device, an internet of things (IoT) terminal device, a subscriber unit, a subscriber station, a mobile station, a remote station, an access point (AP), a remote terminal, an access terminal, a user terminal, a user agent, a user device, a wearable device, a vehicle-mounted device, or the like.

By way of example, and not limitation, the terminal device in embodiments of this application may alternatively be a wearable device. The wearable device may also be referred to as a wearable intelligent device, an intelligent wearable device, or the like, and is a general term for wearable devices that are intelligently designed and developed for daily wear by using a wearable technology, for example, glasses, gloves, watches, clothes, and shoes. The wearable device is a portable device that is worn on a body directly or integrated into clothes or an accessory of a user. The wearable device is not only a hardware device, but also implements a powerful function through software support, data exchange, and cloud interaction. In a broad sense, wearable intelligent devices include full-featured and large-sized devices that can implement all or some of functions without relying on smartphones, for example, smart watches or smart glasses, and include devices that focus only on a type of application function and need to be used together with other devices such as smartphones, for example, various smart bands, smart helmets, or smart jewelry for monitoring physical signs.

If the various terminal devices described above are located in a vehicle (for example, placed in the vehicle or installed in the vehicle), the terminal devices may be all considered as vehicle-mounted terminal devices. For example, the vehicle-mounted terminal devices are also referred to as on-board units (OBU).

(2) A communication system is configured to: when a terminal device requests a service, connect the terminal device to a data network by using a 3rd Generation Partnership Project (3GPP) access technology, and implement data transmission between the terminal device and the data network to implement a corresponding service.

The communication system is divided into an access network (AN) and a core network (CN). The access network is used to connect the terminal device to the core network by using the 3GPP access technology. The core network is used to connect the terminal device to different data networks. In addition, the core network may be divided into a control plane and a user plane based on logical function division.

It should be further noted that communication systems to which the communication method provided in this application is applicable include a fifth generation (5G) communication system (namely, a new radio (NR) communication system), a new generation communication system in the future, and the like.

For another example, in a 5G communication system, an access network may alternatively be referred to as a 5G radio access network (NG-radio access network (RAN), namely, an NG-RAN), and a core network may alternatively be referred to as a 5G core (5GC) network.

(3) A network device is a network element in a communication system. The network device may be an access network device (RAN device) in a radio access network, or a core network device in a core network. This is not limited in this application.

(4) A core network device is a network element in a core network, and is configured to implement a function of the core network. For example, the core network device is responsible for connecting a terminal device to different data networks based on a call request or a service request sent by the terminal device over an access network, and is responsible for services such as charging, mobility management, and session management. The method provided in embodiments of this application is applied to a network assisted positioning scenario. Therefore, core network devices in this application include network elements that implement an access and mobility management function of a terminal device and a location management function in a core network. Certainly, the core network may also include another network element, which is not enumerated herein.

For example, in a 5G mobile communication system, a network element that implements an access and mobility management function may be referred to as an access and mobility management function (AMF) network element, which is referred to as an AMF for short. In the 5G mobile communication system, a network element that implements a location management function may be referred to as a location management function (LMF) network element, which is referred to as an LMF for short.

It should be further noted that a name of a network element that implements an access and mobility management function is not limited in this application. The network element may further implement another function or integrate with another functional network element, and may also be referred to as another name. Similarly, a name of a network element that implements a location management function is not limited. The network element may further implement another function or integrate with another functional network element, and may also be referred to as another name.

(5) A radio access network device in a next-generation radio access network (NG-RAN) may also be referred to as a base station, a RAN node, or a RAN device. The RAN device is an entity configured to transmit and/or receive a signal on a network side, and is a device configured to connect a terminal device to a wireless network in a communication system. The RAN device may further coordinate attribute management of an air interface.

For example, the RAN device may be a new radio controller (NR controller), a gNodeB (gNB) in a 5G system, a centralized unit, a new radio base station, a remote radio unit, a micro base station (also referred to as a small cell), a relay, a distributed unit, a macro base station in various forms, a transmission/reception point (TRP), a transmission measurement function (TMF) or a transmission point (TP) or any other radio access device, or a base station in next-generation communication. This is not limited in embodiments of this application.

It should be noted that in this application, "and/or" describes an association relationship between associated objects and indicates that three relationships may exist. For example, A and/or B may indicate the following three cases: Only A exists, both A and B exist, and only B exists. The character "/" generally indicates an "or" relationship between the associated objects. "A plurality of" in this application means two or more. "At least one" means one or more. In addition, it should be understood that terms such as "first" and "second" in the description of this application are merely used for distinguishing and description, but should not be understood as indicating or implying relative importance, or should not be understood as indicating or implying a sequence.

It should be noted that a mobile originated location request MO-LR (Mobile Originating Location Request), a mobile terminated location request MT-LR (Mobile Terminating Location Request), a network induced location request NI-LR (Network Induced Location Request), a terminal assisted positioning procedure (UE Assisted Positioning Procedure), a terminal based positioning procedure (UE Based Positioning Procedure), a network assisted positioning procedure, and a procedure for obtaining non-UE-associated network assistance data in embodiments of this application may be standard procedures specified in a communication standard, such as procedures specified in the communication standard 3GPP TS 23.273. In addition, for a message, signaling, and the like in the foregoing procedures, refer to definitions in the communication standard.

Figure 1B:
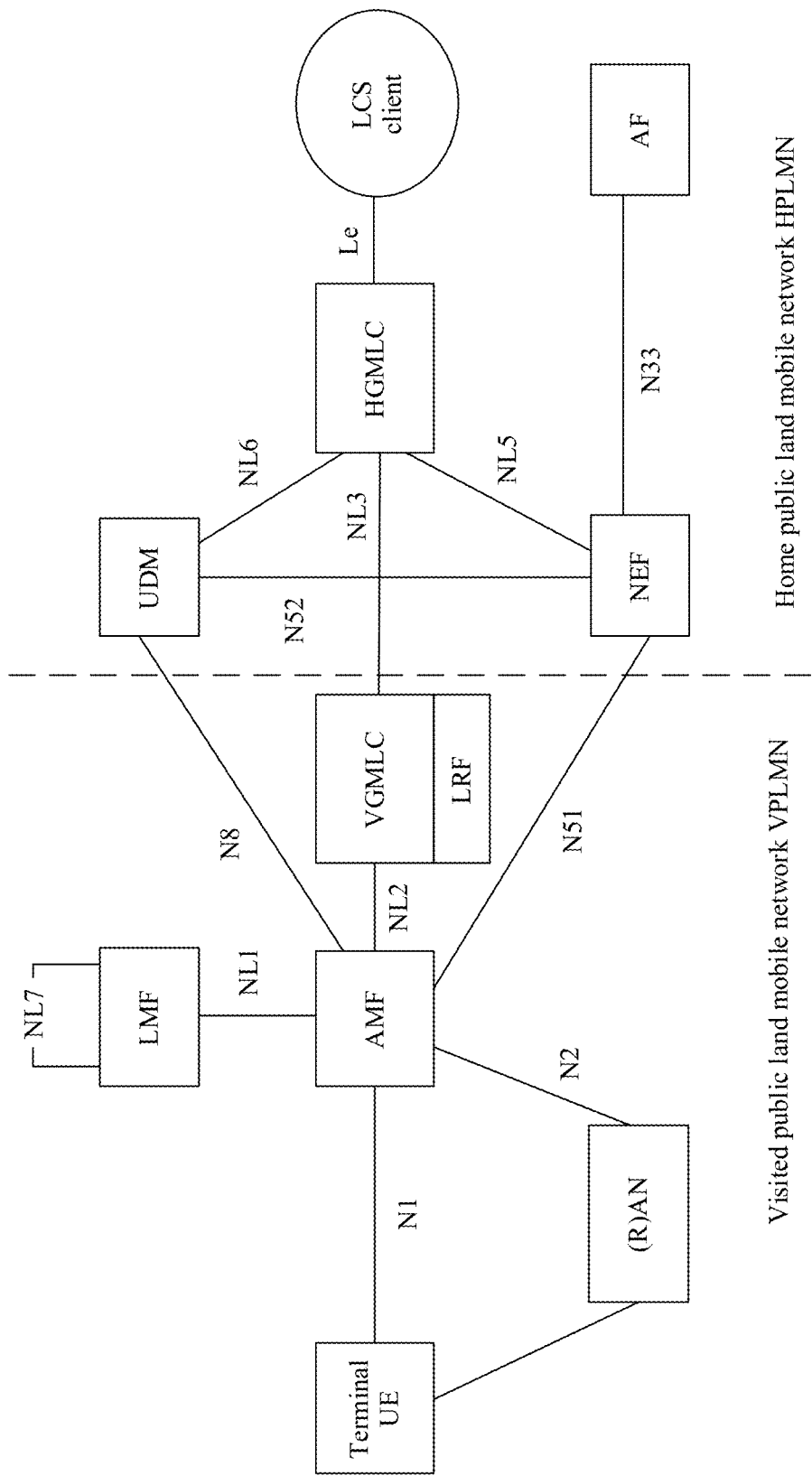
FIG. 1*b* is a schematic diagram of another communication architecture according to an embodiment of this application.

FIG. 1a and FIG. 1b each are a schematic diagram of a communication architecture applicable to a communication method provided in embodiments of this application. FIG. 1a is a schematic diagram of a communication architecture for terminal positioning in a non-roaming scenario, and FIG. 1b is a schematic diagram of a communication architecture for terminal positioning in a roaming scenario. FIG. 1a or FIG. 1b shows some example network elements and devices related to embodiments of this application.

The communication architecture is compatible with communication systems of a plurality of different standards. In FIG. 1a or FIG. 1b, a 5G communication system is used as an example for description.

It should be noted that this application imposes no limitation on a communication architecture applicable to the method provided in this application. The architecture may further be any one of the following communication systems: a 5G communication system, a future next-generation communication system, and a communication system evolved based on the foregoing communication systems.

In conclusion, the communication architecture described in embodiments of this application is intended to describe the technical solutions in embodiments of this application more clearly, and does not constitute a limitation on the technical solutions provided in embodiments of this application. A person of ordinary skill in the art may learn that the technical solutions provided in embodiments of this application are also applicable to similar technical problems and scenarios, despite the development of a communication technology and evolution of a network architecture.

The communication architecture shown in FIG. 1a or FIG. 1b is an architecture for a location service in a 5G network, and includes a terminal, a RAN device, a core network, and a location service platform (a location service client).

The core network includes an LMF network element, an AMF network element, a unified data management (UDM) network element, a gateway mobile location center (GMLC) network element, a location retrieval function (LRF) network element, and the like.

The LMF network element is connected to the AMF network element through an NL1 interface. The LMF network element supports different types of terminal-associated location services, including terminal positioning and transmitting assistance data to a terminal. The AMF network element may receive a terminal-associated location service request from a 5th generation core network location services (5GC LCS) entity. Alternatively, the AMF network element may start location services on behalf of a terminal, and forward a location service request to the LMF network element. The GMLC network element and the LRF network element may be deployed together or independently. The GMLC network element may be further divided into a visited gateway mobile location center (VGMLC) network element and a home gateway mobile location center (HGMLC) network element (as shown in FIG. 1b). The AMF network element is connected to the GMLC network element through an NLg interface, and is connected to the LMF network element through an NLs interface. If no LMF network element is deployed in a live network, the AMF network element works with the GMLC network element to implement a simple positioning function.

In the 5G communication system, two network devices may communicate with each other through a corresponding interface. For details, refer to FIG. 1a or FIG. 1b. It should be noted that N1, N2, N8, N33, N51, N52, NL1, NL2, NL3, NLS, NL6, NL7, and Le shown in FIG. 1a or FIG. 1b, and an abbreviation such as NG in later descriptions represent communication interfaces or reference points used to support information transmission between devices, between a device and a network element, or between network elements in a 5G network. For details, refer to definitions in a related 5G communication standard.

It should be understood that the foregoing network elements in the 5G communication system may be network elements implemented on dedicated hardware, may be software instances running on dedicated hardware, or may be instances of virtualized functions on a virtualization platform (such as a cloud platform). In addition, a distribution form of network elements in the communication system is not limited in embodiments of this application. In some embodiments, the foregoing network elements may be separately deployed on different physical devices, or a plurality of network elements are integrated into a same physical device.

In addition, names of the network elements in the communication system are not limited in embodiments of this application. For example, in communication systems of different standards, the network elements may have other names. For another example, when the plurality of network elements are integrated into the same physical device, the physical device may have another name.

For ease of description, in the following embodiments of this application, the AMF network element is briefly referred to as an AMF, the LMF network element is briefly referred to as an LMF, the GMLC network element is briefly referred to as a GMLC, the VGMLC network element is briefly referred to as a VGMLC, the HGMLC network element is briefly referred to as an HGMLC, the UDM network element is briefly referred to as a UDM, a NEF network element is briefly referred to as a NEF, the LRF network element is briefly referred to as an LRF, and the AF network element is briefly referred to as an AF.

In a terminal positioning procedure, location services specified in a communication protocol standard are classified into the following three types based on different initiators of location requests:

(1) Mobile originated location request MO-LR
(2) Mobile terminated location request MT-LR
(3) Network induced location request NI-LR Details are described below.

An MO-LR is a location request that is directly initiated by a mobile terminal to a location management system through an air interface.

Figure 2:
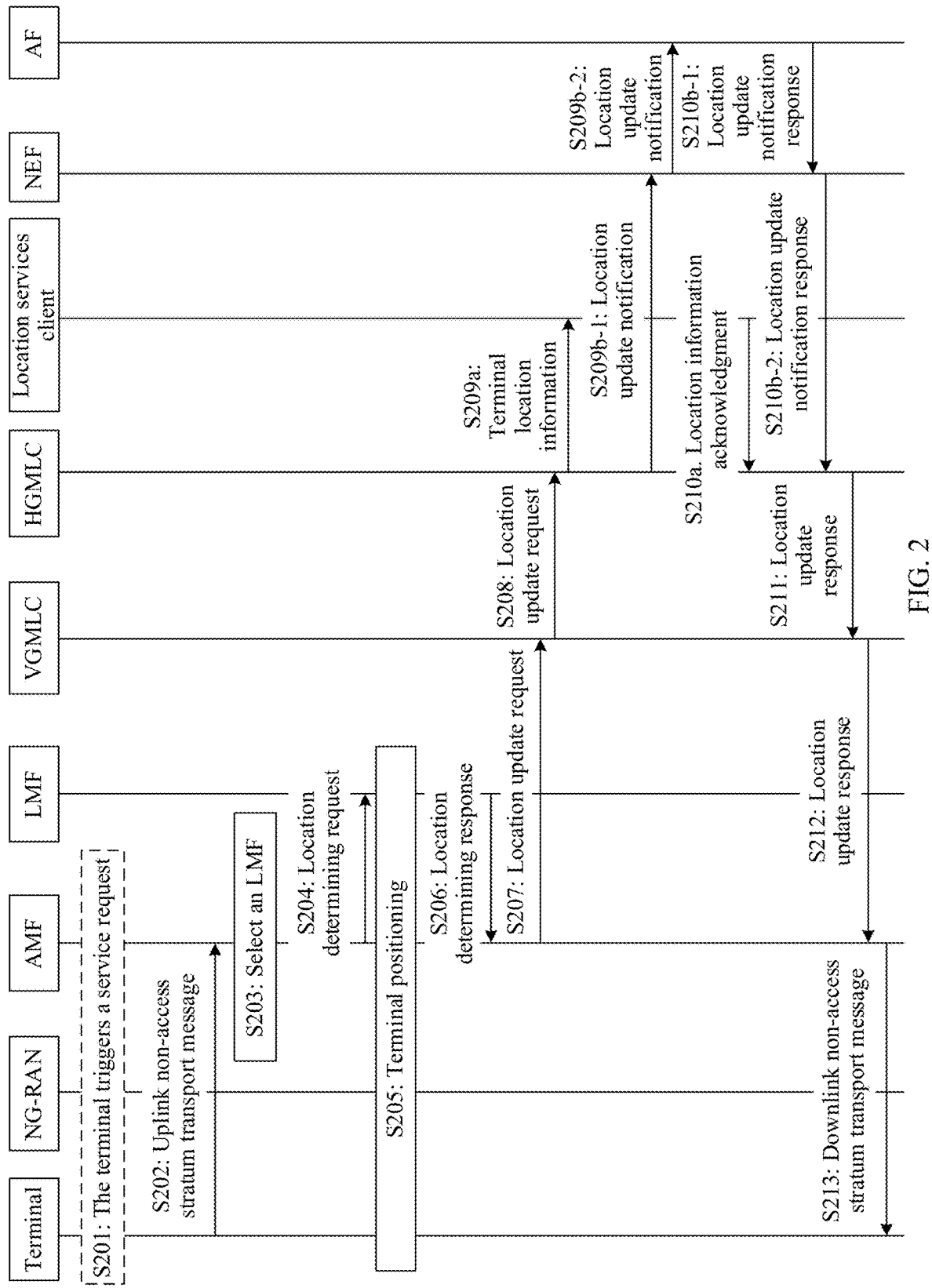
FIG. 2 is a schematic diagram depicting a positioning procedure and signaling interaction in MO-LR mode according to an embodiment of this application.

As shown in FIG. 2, a positioning procedure and signaling interaction in this mode include the following operations:

S201: A terminal triggers a service request, where the service request is used to request to position the terminal.

S202: The terminal sends an uplink non-access stratum transport (UL NAS TRANSPORT) message to an AMF, where the uplink non-access stratum transport message is used to transmit an MO-LR.

S203: The AMF selects an LMF that is responsible for positioning the terminal.

S204: The AMF sends a location determining request (Nlmf_Location_DetermineLocation Request) to the selected LMF, where the location determining request is used to request the LMF to position the terminal.

S205: Position the terminal. The terminal is positioned based on the terminal, a RAN device, the AMF, and the LMF, to obtain location information of the terminal.

S206: The LMF returns a location determining response (Nlmf_Location_DetermineLocation Response) to the AMF, where the location determining response carries the location information of the terminal.

S207: The AMF sends a location update request (Ngmlc_Location_LocationUpdate Request) to a VGMLC, where the location update request carries the location information of the terminal.

S208: The VGMLC sends the location update request (Ngmlc_Location_LocationUpdate Request) to an HGMLC, where the location update request carries the location information of the terminal.

S209a: The HGMLC sends the location information of the terminal to a location service client.

S209b-1: The HGMLC sends a location update notification (Ngmlc_Location_LocationUpdate Notify) to a NEF, where the location update notification carries the location information of the terminal.

S209b-2: The NEF sends the location update notification (Nnef_Location_LocationUpdate Notify) to an AF, where the location update notification carries the location information of the terminal.

S210a: The location service client returns a location information acknowledgment (Location Information ACK) to the HGMLC.

S210b-1: The AF returns a location update notification response (Nnef_Location_LocationUpdate Notify Response) to the NEF.

S210b-2: The NEF returns the location update notification response (Ngmlc_Location_LocationUpdate Notify Response) to the HGMLC.

S211: The HGMLC returns a location update response (Ngmlc_Location_LocationUpdate Response) to the VGMLC.

S212: The VGMLC returns the location update response (Ngmlc_Location_LocationUpdate Response) to the AMF.

S213: The AMF returns a downlink non-access stratum transport (DL NAS TRANSPORT) message to the terminal, where the uplink non-access stratum transport message is used to transmit an MO-LR response, and the MO-LR response carries the location information of the terminal.

An MT-LR is any location request sent from a location service (LCS) client to an LCS server. This method provides a passive query mechanism from the viewpoint of a to-be-positioned side. The MT-LR request mode is most commonly used because the LCS server can develop various applications based on a positioning capability of an operator network, and a subscriber can clarify a location request of the subscriber based on various access types of location services.

Figure 3:
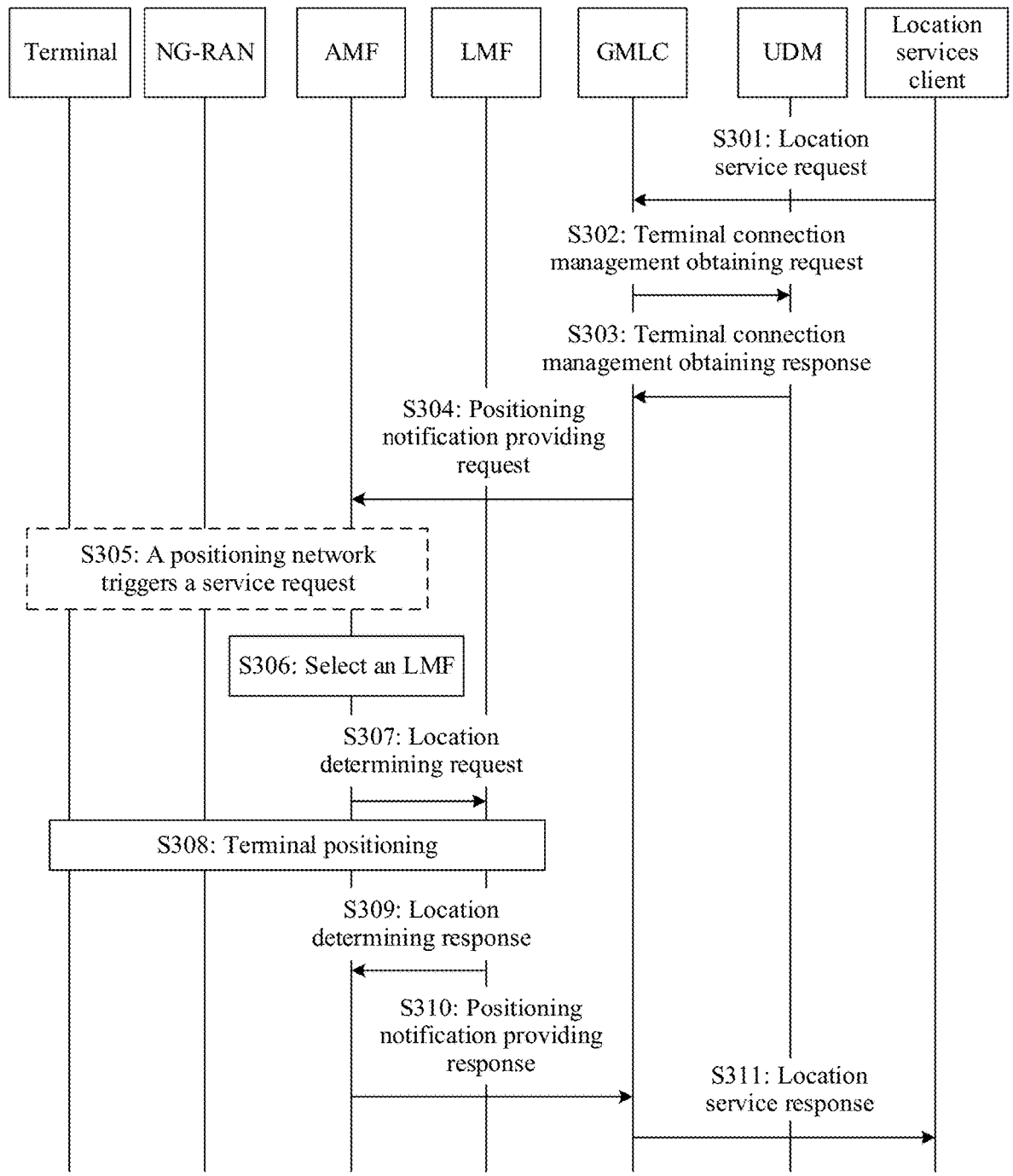
FIG. 3 is a schematic diagram depicting a positioning procedure and signaling interaction in MT-LR mode according to an embodiment of this application.

As shown in FIG. 3, a positioning procedure and signaling interaction in this mode include the following operations:

S301: A location service client sends a location service request (LCS Service Request) to a GMLC, where the location service request is used to request to obtain location information of a terminal.

S302: The GMLC sends a terminal connection management obtaining request (Nudm_UECM_Get_Request) to a UDM.

S303: The UDM sends a terminal connection management obtaining response (Nudm_UECM_Get_Response) to the GMLC.

S304: The GMLC sends a positioning notification providing request (Namf_Location_ProvidePositioningInfo_Request) to an AMF.

S305: A positioning network triggers a service request, where the service request is used to request to position the terminal.

S306: The AMF selects an LMF that is responsible for positioning the terminal.

S307: The AMF sends a location determining request (Nlmf_Location_DetermineLocation Request) to the LMF, where the location determining request is used to request the LMF to position the terminal, to obtain the location information of the terminal.

S308: Position the terminal. The terminal is positioned based on the terminal, a RAN device, the AMF, and the LMF, to obtain the location information of the terminal.

S309: The LMF returns a location determining response (Nlmf_Location_DetermineLocation Response) to the AMF, where the location determining response carries the location information of the terminal.

S310: The AMF returns a positioning notification providing response (Namf_Location_ProvidePositioningInfo Response) to the GMLC, where the positioning notification providing response carries the location information of the terminal.

S311: The GMLC returns a location service response (LCS Service Response) to the location service client, where the location service response carries the location information of the terminal.

An NI-LR is a location request sent from inside a public land mobile network (PLMN) that is serving a terminal, and is mainly used to position an emergency caller.

Figure 4:
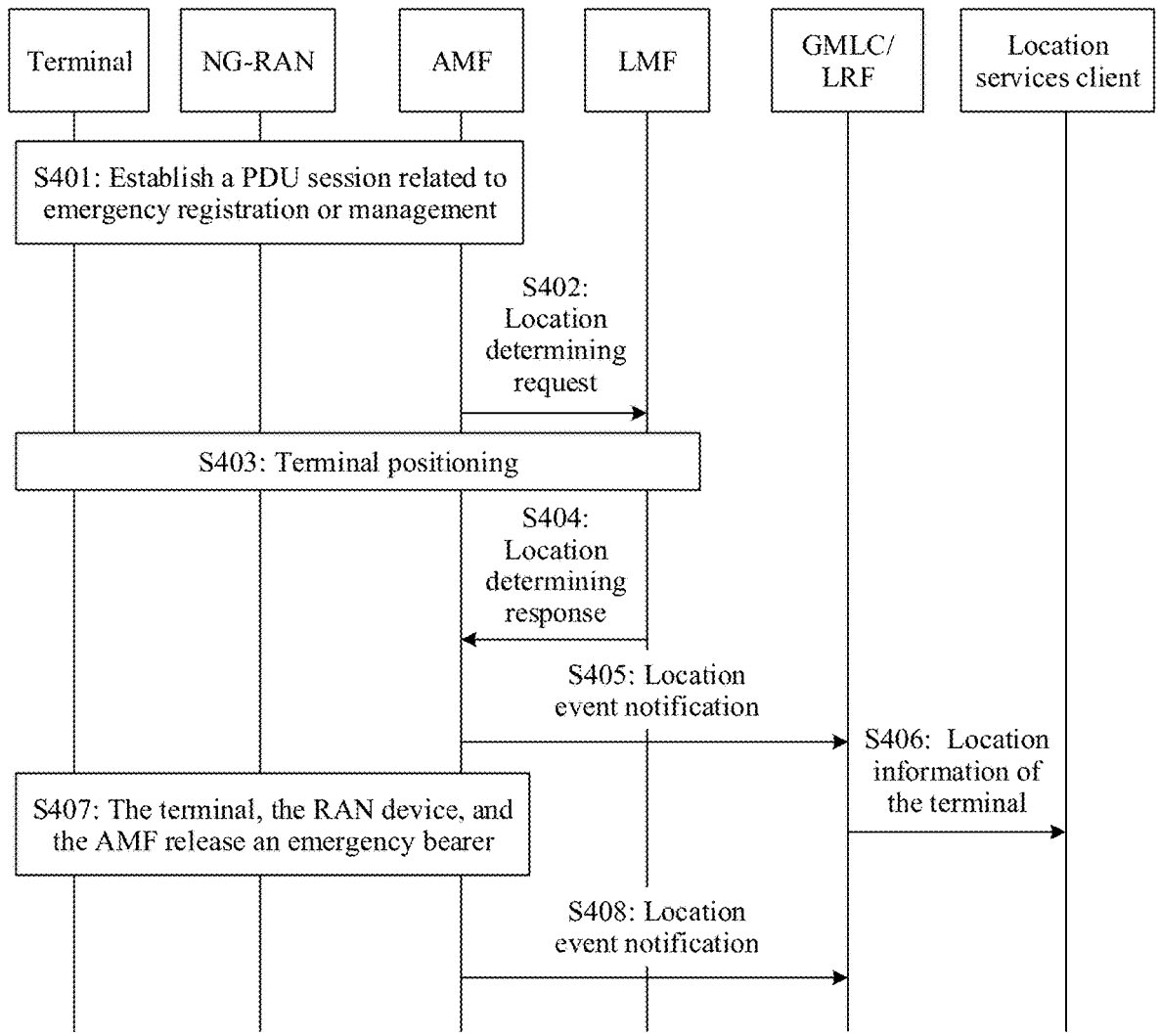
FIG. 4 is a schematic diagram depicting a positioning procedure and signaling interaction in NI-LR mode according to an embodiment of this application.

As shown in FIG. 4, a positioning procedure and signaling interaction in this mode include the following operations:

S401: Establish a PDU session related to emergency registration or management.

S402: An AMF sends a location determining request (Nlmf_Location_DetermineLocation Request) to an LMF, where the location determining request is used to request the LMF to position a terminal.

S403: Position the terminal. The terminal is positioned based on the terminal, a RAN device, the AMF, and the LMF, to obtain location information of the terminal.

S404: The LMF returns a location determining response (Nlmf_Location_DetermineLocation Response) to the AMF, where the location determining response carries the location information of the terminal.

S405: The AMF sends a location event notification (Namf_Location_EventNotify) to a GMLC or an LRF.

S406: The GMLC or the LRF sends the location information of the terminal to a location service client.

S407: The terminal, the RAN device, and the AMF release an emergency bearer (Release Emergency Bearer).

S408: The AMF sends a location event notification (Namf_Location_EventNotify) to the GMLC or the LRF.

The positioning procedures in the foregoing three modes include a same positioning sub-procedure, namely, terminal positioning (UE Positioning).

The terminal positioning sub-procedure may be implemented by using any one of the following solutions 1 to 3. The LMF determines, based on a subscriber capability and other information, a solution to be used for terminal positioning in a positioning procedure.

Solution 1: Terminal Assisted Location Positioning Procedure (UE Assisted Positioning Procedure)

In the terminal assisted location positioning procedure, a terminal obtains location-associated data through measurement, and sends a measurement result to the LMF. The LMF calculates location information of the terminal based on measurement data returned by the terminal.

Solution 2: Terminal Based Positioning Procedure (UE Based Positioning Procedure)

In the terminal based positioning procedure, a terminal performs measurement and calculation to obtain location information, and sends the location information to the LMF. The terminal assisted positioning procedure is the same as the terminal based positioning procedure.

Solution 3: Network Assisted Positioning Procedure (Network Assisted Positioning Procedure)

In the network assisted positioning procedure, a RAN device that provides a service for a terminal configures measurement logic of a measurement task for positioning the terminal, and sends the information to the LMF. The information includes, for example, a measurement frequency, a time period, and a neighboring-cell base station that needs to participate in location measurement of the terminal. Then, the LMF sends signaling based on the information, and specifies one or more RAN devices to obtain location-associated data of the terminal through measurement. Finally, the LMF calculates location information of the terminal based on measurement data that is fed back by all RAN devices participating in the current measurement task.

Figure 5:
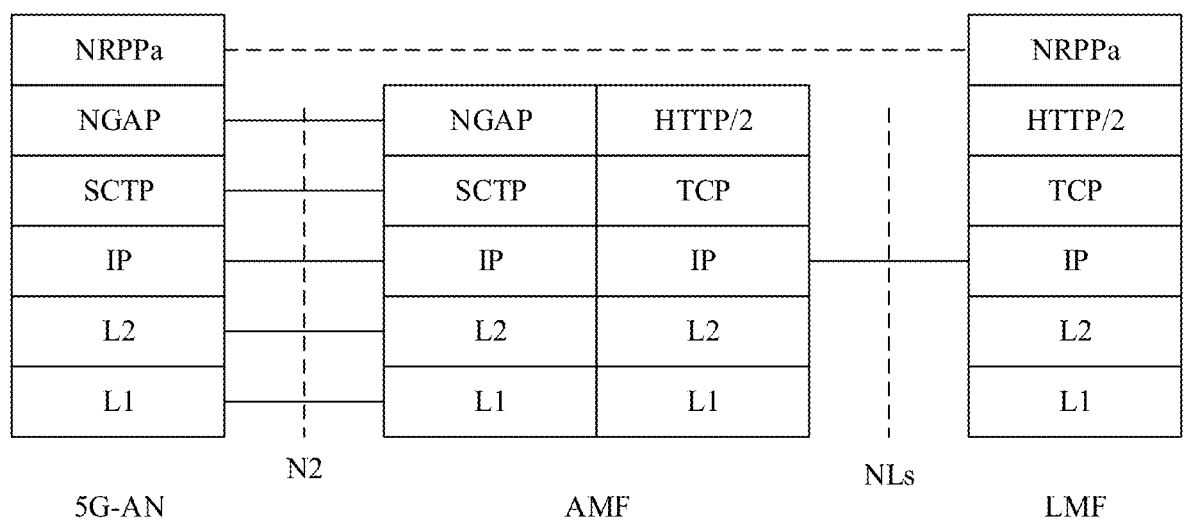
FIG. 5 is a schematic diagram of a protocol stack used in a network assisted location positioning procedure according to an embodiment of this application.

FIG. 5 shows a protocol stack involved in the positioning procedure of Solution 3. Signaling (or a message) for location measurement uses the new radio positioning protocol annex (NRPPa). LCS-associated location measurement signaling is forwarded between the AMF and the LMF by using the hypertext transfer protocol (HTTP). LCS-associated location measurement signaling is transmitted between the RAN device and the AMF by using the NG application protocol (NGAP).

As shown in FIG. 5, the RAN device is connected to the AMF through an N2 interface. A protocol stack used by the RAN device to interact with the AMF includes the NRPPa, the NGAP, the stream control transmission protocol (SCTP), the internet protocol (IP), a layer (L) 2, and a layer (L) 1 from top to bottom. A protocol stack used by the AMF to interact with the RAN includes the NGAP, the SCTP, the IP, the L2, and the L1 from top to bottom. The AMF and the LMF are connected through an NLs interface. A protocol stack used by the AMF to interact with the LMF includes the hypertext transfer protocol 2.0 (HTTP/2), the transmission control protocol (TCP), the IP, the L2, and the L1 from top to bottom. A protocol stack used by the LMF to interact with the AMF includes the NRPPa, the HTTP/2, the TCP, the IP, the L2, and the L1 from top to bottom.

Figure 6A:
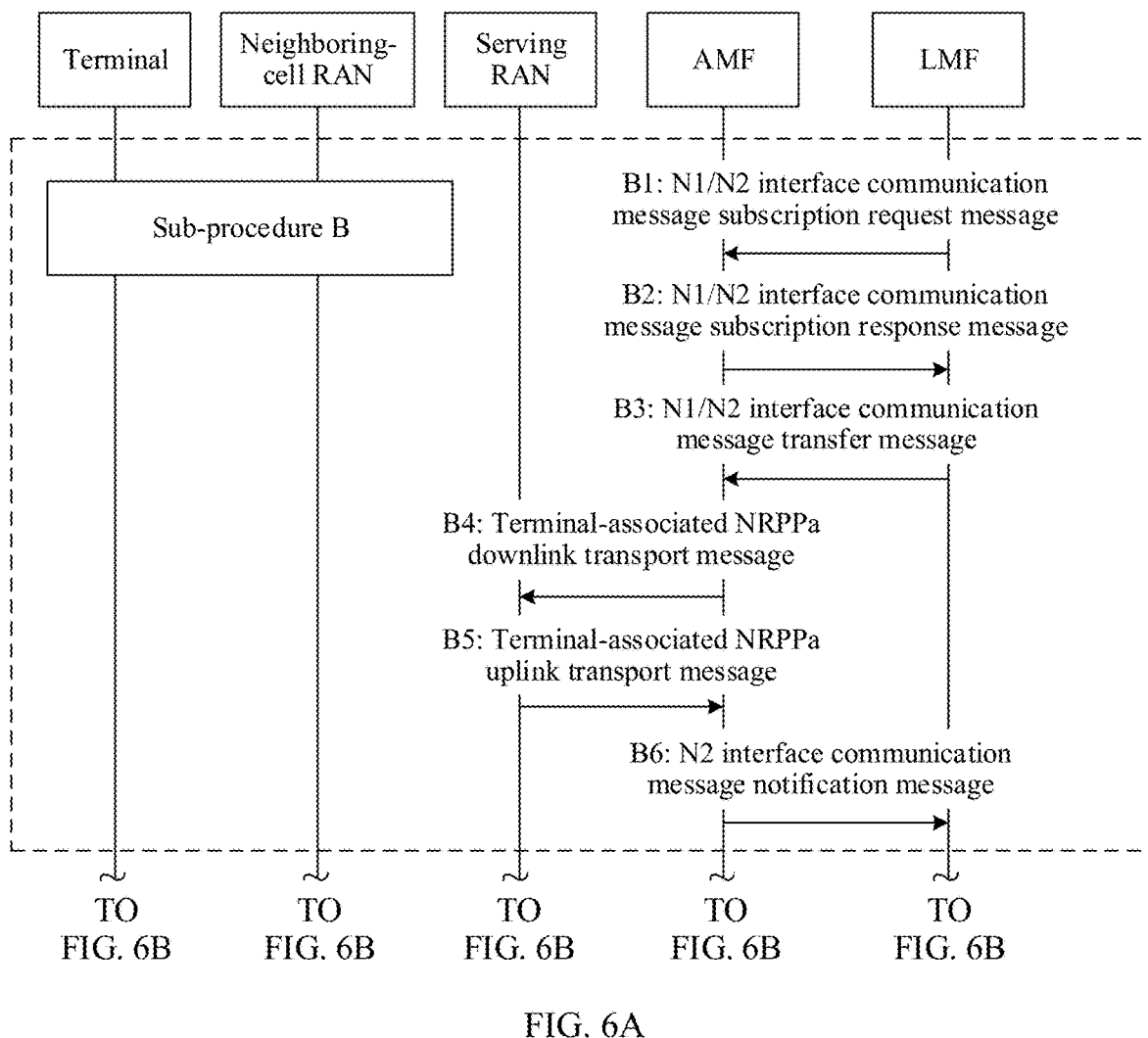
FIG. 6A and FIG. 6B are a schematic diagram of a network assisted location positioning procedure according to an embodiment of this application.
Figure 6B:
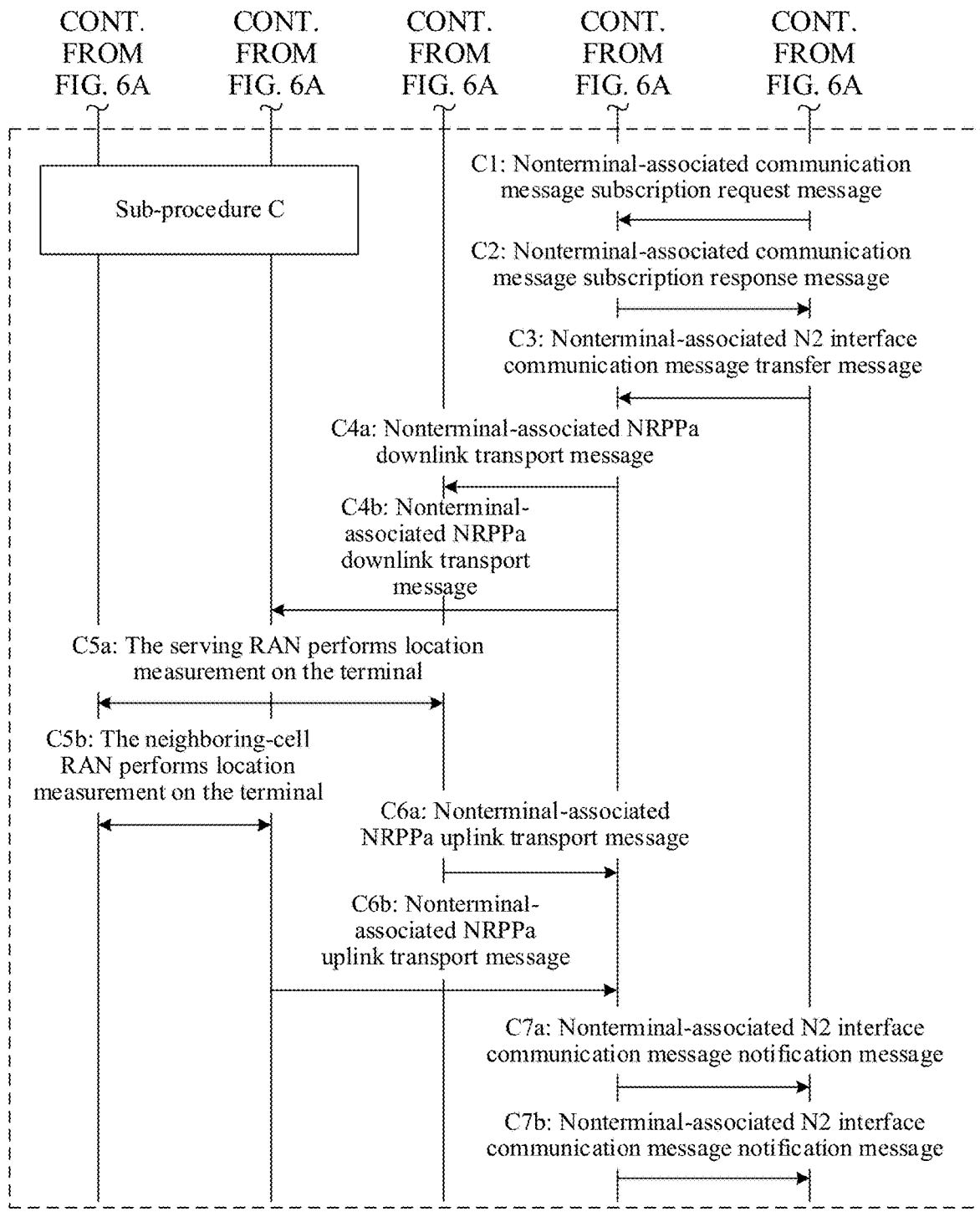

FIG. 6A and FIG. 6B show the network assisted location positioning procedure and signaling interaction of Solution 3. The network assisted location positioning procedure includes sub-procedures B and C. The sub-procedure B is a network assisted positioning procedure, and is used by an LMF to obtain, from a serving RAN device via an AMF, configuration information for positioning a terminal. The sub-procedure C is a procedure for obtaining nonterminal-associated network assistance data. The LMF uses the procedure to specify some RAN devices to position a terminal having specified characteristic information. A RAN device participating in positioning cannot obtain a terminal identifier. Therefore, the procedure is referred to as a procedure for obtaining nonterminal-associated network assistance data in the protocol.

As shown in FIG. 6A and FIG. 6B, the network assisted positioning procedure and signaling interaction include the sub-procedures B and C.

(1) the Sub-Procedure B is the Network Assisted Positioning Procedure, which Includes the Following Operations.

Operation B1: The LMF sends an N1/N2 interface communication message subscription request message to the AMF.

When determining, based on an LCS capability of the terminal and local configurations, to perform the network assisted location positioning procedure, the LMF sends the N1/N2 interface communication message subscription request (Namf_Communication_N1N2MessageSubscribe Request) message to the AMF, to subscribe to, from the AMF, a message notification transmitted through an N1 interface (a signaling message interface between the terminal and the AMF) message notification or an N2 interface (a signaling message interface between the RAN device and the AMF). The request message includes a terminal identifier (UE ID), an N1 message notification callback uniform resource identifier N1NotifyCallbackUri, and an N2 message notification callback uniform resource identifier N2NotifyCallbackUri.

Operation B2: The AMF sends an N1/N2 interface communication message subscription response message to the LMF.

The AMF determines whether a subscriber is legitimate based on the terminal identifier. If the subscriber is registered with the AMF, the AMF stores subscription information, generates a corresponding subscription identifier n1n2NotifySubscriptionId, and returns the identifier to the LMF by using the N1/N2 interface communication message subscription response (Namf_Communication_N1N2MessageSubscribe Response) message.

Operation B3: The LMF sends an N1/N2 interface communication message transfer message to the AMF.

The LMF sends the N1/N2 interface communication message transfer (Namf_Communication_N1N2MessageTransfer) message to the AMF, where the message carries the terminal identifier, an LCS correlation identifier (LCS Correlation ID, which is used to identify a local positioning procedure between the AMF and the LMF), an LMF instance identifier (LMF Instance ID), and a positioning information request message. The positioning information request message is used by the LMF to request the serving RAN device to provide assistance information related to location measurement, for example, information such as sounding reference signal (SRS) configuration information, and an identifier of a neighboring-cell base station participating in measurement.

Operation B4: The AMF sends a terminal-associated NRPPa downlink transport message to the serving RAN device.

The AMF finds, based on the terminal identifier carried in the N1/N2 interface communication message transfer message, the serving RAN device that provides a service for the terminal; and sends the terminal-associated NRPPa downlink transport (Downlink UE associated NRPPa Transport) message to the RAN device. The terminal-associated NRPPa downlink transport message carries temporary subscriber identifiers (an AMF UE NGAP ID and a RAN UE NGAP ID), a routing identifier (Routing ID, which is used to identify a current positioning procedure between the RAN and the AMF), and the positioning information request message. The AMF UE NGAP ID is a temporary identifier allocated by the AMF to the terminal, and the RAN UE NGAP ID is a temporary identifier allocated by the RAN device to the terminal.

Operation B5: The serving RAN device sends a terminal-associated NRPPa uplink transport message to the AMF.

After receiving the positioning information request message, the serving RAN device obtains positioning assistance information of the terminal, for example, information such as the SRS configuration information, and the identifier of the neighboring-cell base station participating in measurement. The serving RAN device sends the terminal-associated NRPPa uplink transport (Uplink UE associated NRPPa Transport) message to the AMF, where the message carries a positioning information response message, the temporary subscriber identifiers (the AMF UE NGAP ID and the RAN UE NGAP ID), and the routing ID. The positioning information response message carries the positioning assistance information obtained by the serving RAN device, for example, the SRS configuration information and the identifier of the neighboring-cell base station participating in measurement.

Operation B6: The AMF sends an N2 interface communication message notification message to the LMF.

The AMF finds a corresponding N2NotifyCallbackUri based on the subscriber identifier, where the N2NotifyCallbackUri indicates an N2 message notification callback address of the LMF. Then, the AMF sends, to the LMF, the N2 interface communication message notification (Namf_Communication_N2InfoNotify) message that carries the positioning response message.

(2) the Sub-Procedure C is the Procedure for Obtaining Nonterminal-Associated Network Assistance Data, which Includes the Following Operations.

Operation C1: The LMF sends a nonterminal-associated communication message subscription request message to the AMF.

The LMF selects, based on information obtained in operation B6, RAN devices participating in positioning the terminal, and sends the nonterminal-associated communication message subscription request (Namf_Communication_NonUeMessageSubscribe Request) message to subscribe to, from the AMF, a message notification transmitted through an N2 interface (a signaling message interface between the RAN and the AMF). The nonterminal-associated communication message subscription request message carries information such as a RAN device identifier list (RAN ID List), an NF instance identifier (NF Instance ID), and an N2NotifyCallbackUri.

Operation C2: The AMF sends a nonterminal-associated communication message subscription response message to the LMF.

The AMF determines, based on the RAN ID list, whether a link has been established between each RAN device in the list and the AMF. If a link has been established between each RAN device in the list and the AMF, the AMF stores subscription information, generates a corresponding subscription identifier n2NotifySubscriptionId, and returns the identifier to the LMF by using the nonterminal-associated communication message subscription response (Namf_Communication_NonUeMessageSubscribe Response) message.

Operation C3: The LMF sends a nonterminal-associated N2 interface communication message transfer message to the AMF.

The LMF sends the nonterminal-associated N2 interface communication message transfer (Namf_Communication_NonUeN2MessageTransfer) message to the AMF based on the positioning assistance information in the positioning information response message received in operation B6. The nonterminal-associated N2 interface communication message transfer message carries the NF instance identifier, a tracking area identifier list (TAL List), an identifier list of RAN devices that need to participate in location measurement, and location measurement request information. The location measurement request message includes assistance information such as an SRS configuration. The assistance information includes specified characteristic information of the terminal, and is used by the RAN device to identify the terminal having the characteristic information and perform location measurement on the terminal.

The RAN devices that need to participate in measurement include a serving RAN device of the terminal, and may further include a neighboring-cell RAN device of the serving RAN device.

Operation C4: The AMF sends a nonterminal-associated NRPPa downlink transport message to each of the serving RAN device and the neighboring-cell RAN device.

As shown in FIG. 6A and FIG. 6B, operation C4 includes the following two sub-operations:

Operation C4a: The AMF sends the nonterminal-associated NRPPa downlink transport message to the serving RAN device.

Operation C4b: The AMF sends the nonterminal-associated NRPPa downlink transport message to the neighboring-cell RAN device.

In operation C4, the AMF sends, based on the tracking area identifier list carried in the nonterminal-associated N2 interface communication message transfer message or the identifier list that is of RAN devices that need to participate in location measurement and that is carried in the nonterminal-associated N2 interface communication message transfer message in operation C3, the nonterminal-associated NRPPa downlink transport message (Downlink NonUe associated NRPPa Transport) to each of the RAN devices that participate in location measurement. The nonterminal-associated NRPPa downlink transport message carries the location measurement request message and a routing ID.

It should be noted that FIG. 6A and FIG. 6B use only the serving RAN device and the neighboring-cell RAN device as an example to describe the procedure for obtaining nonterminal-associated network assistance data. In an actual procedure, there may be more RAN devices participating in terminal location measurement, and each RAN device participates in terminal location measurement by using a method the same as that in this embodiment.

Operation C5: The serving RAN device and the neighboring-cell RAN device each perform location measurement on the terminal.

As shown in FIG. 6A and FIG. 6B, operation C5 includes the following two sub-operations:

Operation C5a: The serving RAN device performs location measurement on the terminal.

Operation C5b: The neighboring-cell RAN device performs location measurement on the terminal.

In operation C5, the serving RAN device and the neighboring-cell RAN device each perform location measurement on the terminal, to obtain location measurement information of the terminal.

Operation C6: The serving RAN device and the neighboring-cell RAN device each send a nonterminal-associated NRPPa uplink transport message to the AMF.

As shown in FIG. 6A and FIG. 6B, operation C6 includes the following two sub-operations:

Operation C6a: The serving RAN device sends the nonterminal-associated NRPPa uplink transport message to the AMF.

Operation C6b: The neighboring-cell RAN device sends the nonterminal-associated NRPPa uplink transport message to the AMF.

In operation C6, after the location measurement in operation C5 is completed, the serving RAN device and the neighboring-cell RAN device each send the nonterminal-associated NRPPa uplink transport (Uplink Non UE associated NRPPa Transport) message to the AMF. The message carries a location measurement response message and the routing ID obtained in operation C4. The location measurement response message includes location measurement information (location measurement data) obtained through location measurement performed on the terminal.

Operation C7: The AMF sends nonterminal-associated N2 interface communication message notification messages to the LMF.

As shown in FIG. 6A and FIG. 6B, operation C7 includes the following two sub-operations:

Operation C7a: The AMF sends the nonterminal-associated N2 interface communication message notification message to the LMF based on the nonterminal-associated NRPPa uplink transport message sent by the serving RAN device.

Operation C7b: The AMF sends the nonterminal-associated N2 interface communication message notification message to the LMF based on the nonterminal-associated NRPPa uplink transport message sent by the neighboring-cell RAN device.

In operation C7, after receiving the nonterminal-associated NRPPa uplink transport message sent by the serving RAN device or the neighboring-cell RAN device, the AMF finds a corresponding N2NotifyCallbackUri based on the routing ID carried in the message. The N2NotifyCallbackUri indicates an N2 message notification callback address of the LMF. Then, the AMF returns the location measurement information to the LMF by using the location measurement response message carried in the nonterminal-associated N2 interface communication message notification (Namf_Communication_NonUEN2InfoNotify) message. The nonterminal-associated NRPPa uplink transport message carries the subscription identifier n2NotifySubscriptionId and the location measurement response message.

After obtaining the location measurement information, the LMF may calculate location information of the terminal based on the location measurement information.

Based on the description of the foregoing procedure for obtaining nonterminal-associated network assistance data, it can be learned that in this procedure, messages that are related to terminal location measurement and that are transmitted among the RAN device, the AMF, and the LMF are all network element-level messages. These messages each carry only a network element-level identifier, but not a subscriber-level identifier. Therefore, the following problems exist:

(1) In operation C1, the nonterminal-associated communication message subscription request message carries only a network element-level identifier. Therefore, at a same moment, in a procedure in which a same LMF and a same RAN device obtain nonterminal-associated network assistance data, the AMF can be subscribed to only once.

(2) In operation C3, a positioning request message that is sent by the LMF and that needs to be forwarded by the AMF to the RAN device does not carry any subscriber identifier. The AMF can only transparently transmit the message to the specified RAN device. Therefore, the AMF can only transparently transmit a message between the RAN device and the LMF, and cannot perform further processing.

(3) In operation C6, a positioning response message that is sent by the RAN device and that needs to be forwarded by the AMF to the LMF does not carry any subscriber identifier. The AMF can only transparently transmit the message to the specified LMF. However, the LMF also cannot determine a terminal (subscriber) to which the positioning response message belongs, and can only drop the message or randomly determine a terminal. Consequently, the LMF cannot calculate actual location information of the terminal based on information in the positioning response message, and therefore cannot concurrently perform location measurement on a plurality of terminals.

For example, when the LMF network element subscribes to, from the AMF network element, a message, that is, an N2 message, of a communication interface used to transmit information related to location measurement, only an instance ID of the LMF and the RAN ID are carried. In this case, for a same LMF network element and a same RAN device, the LMF network element can subscribe to an N2 message notification only once from the AMF network element, to ensure that location measurement information of a to-be-positioned terminal is obtained by using the N2 message. Therefore, the LMF can request the RAN device to perform location measurement on only one terminal in coverage of the RAN device at a time, and can obtain location measurement information of only one terminal at a time.

Due to the foregoing limitation, only when an entire procedure for obtaining nonterminal-associated network assistance data corresponds to a terminal, the LMF can determine the terminal corresponding to a message transmitted in an execution process of the procedure. In other words, the LMF can identify, only based on the entire procedure, a terminal corresponding to information related to location measurement. Consequently, efficiency of determining a to-be-positioned object by the LMF is relatively low, and positioning efficiency is affected. In addition, due to the foregoing limitation, the LMF can request the RAN device to perform location measurement on only one terminal in coverage of the RAN device at a time. In other words, terminal location measurement tasks initiated by the LMF can only be serial, and location measurement can be performed only on one terminal in coverage of the RAN device at a time. Location measurement cannot be concurrently performed on a plurality of terminals in coverage of the RAN device.

To resolve the foregoing problem, an embodiment of this application provides a communication method. The communication method is applicable to the communication system architecture shown in FIG. 1a or FIG. 1b.

The communication method provided in this embodiment of this application is applied to, for example, a procedure in which a location management function network element and a radio access network device obtain location measurement information of a terminal. The procedure may be specifically a procedure for obtaining nonterminal-associated network assistance data in a 5G communication system or a next-generation communication system, or another procedure in which location measurement information of a terminal needs to be obtained to calculate location information of the terminal.

It should be noted that the location measurement information in this embodiment of this application is used to calculate location information of the terminal, and the location information may be information such as longitude, latitude, an altitude, atmospheric pressure, or a citizen address of the terminal. The location measurement information includes data that is obtained by the radio access network device through measurement and that can be used to calculate the location information. In the following procedure, a RAN, an AMF, and an LMF in the 5G communication system are used as an example. The RAN may be replaced by a radio access network device, the AMF may be replaced by an access and mobility management network element, and the LMF may be replaced by a location management function network element. It may be understood that a change in a name of a network element does not constitute a limitation on this application.

Figure 7:
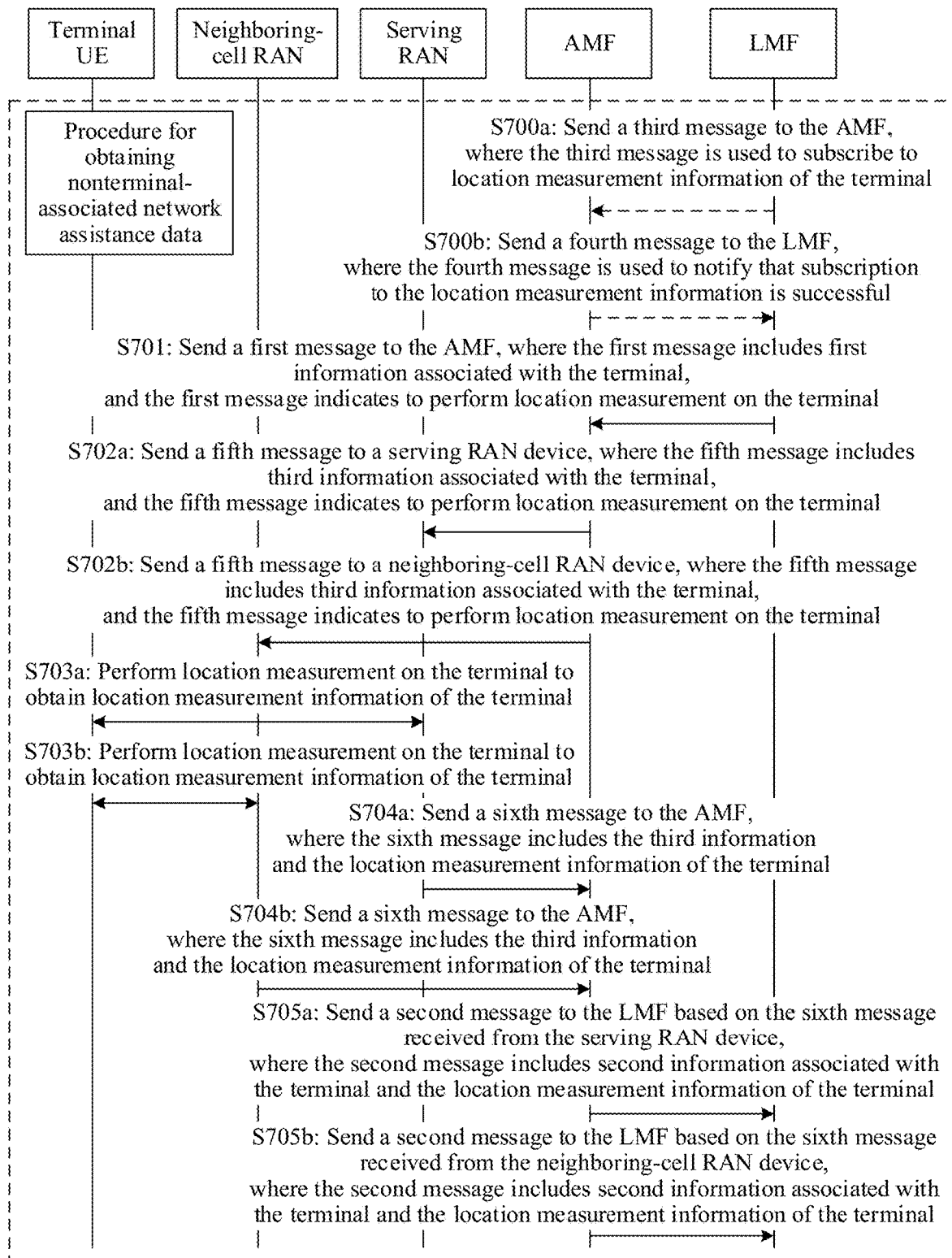
FIG. 7 is a schematic diagram of a communication method according to an embodiment of this application.

FIG. 7 is a schematic diagram of a communication method according to an embodiment of this application. As shown in the figure, the method is applied to a procedure for obtaining nonterminal-associated network assistance data, and includes the following operations.

S701: The LMF sends a first message to the AMF, where the first message includes first information associated with a terminal, and the first message indicates to perform location measurement on the terminal.

In some embodiments of this application, before the AMF sends the first message to the LMF, the AMF, the LMF, and a RAN device participating in location measurement of the terminal have performed a network assisted positioning procedure, which is a sub-procedure of a network assisted location positioning procedure specified in a communication protocol.

For example, before the AMF sends the first message to the LMF, the AMF, the LMF, and the RAN device participating in location measurement of the terminal first perform a sub-procedure B shown in FIG. 6A and FIG. 6B.

In some embodiments of this application, the first information includes any one or more of the following:
a terminal identifier (UE ID), a routing identifier (Routing ID), a location service correlation identifier (LCS Correlation ID), or an N2 interface notification subscription identifier (N2NotifySubscriptionId).

The terminal identifier includes any one or more of the following:
a subscription permanent identifier (SUPI), a generic public subscription identifier (GPSI), a permanent equipment identifier (PEI), a temporary identifier allocated by the location management function network element to the terminal, a temporary identifier allocated by the access and mobility management network element to the terminal, or a temporary identifier allocated by the radio access network device to the terminal.

The subscription permanent identifier, the generic public subscription identifier, or the permanent equipment identifier is a permanent identifier of the terminal. The temporary identifier allocated by the location management function network element to the terminal, the temporary identifier allocated by the access and mobility management network element to the terminal, or the temporary identifier allocated by the radio access network device to the terminal is a temporary identifier of the terminal.

For example, the temporary identifier allocated by the access and mobility management network element to the terminal may be a temporary identifier AMF UE NGAP ID allocated by the access and mobility management network element to the terminal based on the NGAP protocol. The temporary identifier allocated by the radio access network device to the terminal may be a temporary identifier RAN UE NGAP ID allocated by the radio access network device to the terminal based on the NGAP protocol.

In this embodiment of this application, the first message may be N1/N2 interface communication message transfer signaling or nonterminal-associated N2 interface communication message transfer signaling, may be any other message transmitted between the LMF and the AMF, or may be a new-type message agreed on between the LMF and the AMF.

In some embodiments of this application, the first message sent by the LMF to the AMF is any one of the following:

(1) the First Message is the N1/N2 Interface Communication Message Transfer Signaling.

The N1/N2 interface communication message transfer signaling may be an Namf_Communication_N1N2MessageTransfer message. The signaling carries at least one of a terminal identifier (UE ID), an LCS correlation identifier (LCS Correlation ID), a tracking area identifier list, an identifier list of RAN devices that need to participate in location measurement, an NF instance identifier (NF Instance ID), and a location measurement request message. The location measurement request message includes assistance information such as an SRS configuration. The assistance information includes specified characteristic information of the terminal, and is used by the RAN device to identify the terminal corresponding to the characteristic information and perform location measurement on the terminal.

In this case, the first information may be the terminal identifier carried in the N1/N2 interface communication message transfer signaling, and the terminal corresponding to the first message can be determined based on the subscriber identifier.

(2) the First Message is the Nonterminal-Associated N2 Interface Communication Message Transfer Signaling.

The nonterminal-associated N2 interface communication message transfer signaling may be an Namf_Communication_NonUeMessageSubscribe Request message. The signaling carries at least one of the first information, a RAN device identifier list (RAN ID List), an NF instance identifier, and an N2 message notification callback uniform resource identifier N2NotifyCallbackUri. The first information may be the terminal identifier, and the terminal corresponding to the first message can be determined based on the subscriber identifier.

S702: The AMF sends fifth messages to RAN devices, where the fifth message includes third information associated with the terminal, and the fifth message indicates to perform location measurement on the terminal.

S702 includes the following two sub-operations:

S702a: The AMF sends the fifth message to a serving RAN device, where the fifth message includes the third information associated with the terminal, and the fifth message indicates to perform location measurement on the terminal.

S702b: The AMF sends the fifth message to a neighboring-cell RAN device, where the fifth message includes the third information associated with the terminal, and the fifth message indicates to perform location measurement on the terminal.

The serving RAN device is a RAN device that manages a serving cell of the terminal, and the neighboring-cell RAN device is a RAN device that manages a neighboring cell of the serving cell.

In some embodiments of this application, there may be a plurality of neighboring-cell RAN devices participating in location measurement of the terminal. In this embodiment, an example in which one neighboring-cell RAN device participates in location measurement of the terminal is used for description.

In some embodiments of this application, the third information includes any one or more of the following:

the terminal identifier, the routing identifier, the location service correlation identifier, or the N2 interface notification subscription identifier.

The terminal identifier includes any one or more of the following:

the subscription permanent identifier, the generic public subscription identifier, the permanent equipment identifier, the temporary identifier allocated by the location management function network element to the terminal, the temporary identifier allocated by the access and mobility management network element to the terminal, or the temporary identifier allocated by the radio access network device to the terminal.

For details of information included in the third information, refer to the foregoing description of the first information. Details are not repeated.

In this embodiment of this application, the fifth message may be terminal-associated new radio positioning protocol annex downlink transport signaling or nonterminal-associated new radio positioning protocol annex downlink transport signaling, or any other message transmitted between the AMF and the radio access network device, or a new-type message agreed on between the AMF and the radio access network device.

In some embodiments of this application, the fifth message sent by the AMF to the RAN device is any one of the following:

(1) the Fifth Message is the Terminal-Associated New Radio Positioning Protocol Annex Downlink Transport Signaling.

The terminal-associated new radio positioning protocol annex downlink transport signaling may be a downlink UE associated NRPPa transport message. The signaling carries at least one of the following: temporary subscriber identifiers (the AMF UE NGAP ID and the RAN UE NGAP ID) of the terminal, the routing identifier (Routing ID), and the location measurement request message.

In this case, the third information may be the temporary subscriber identifiers carried in the terminal-associated new radio positioning protocol annex downlink transport signaling, and the terminal corresponding to the fifth message can be determined based on the temporary subscriber identifiers.

(2) the Fifth Message is the Nonterminal-Associated New Radio Positioning Protocol Annex Downlink Transport Signaling.

The nonterminal-associated new radio positioning protocol annex downlink transport signaling may be a Downlink NonUe associated NRPPa Transport message. The signaling carries at least one of the third information, the routing identifier (Routing ID), and the location measurement request message. The third information may be the terminal identifier, and the terminal corresponding to the fifth message can be determined based on the subscriber identifier.

S703: The RAN devices perform location measurement on the terminal, to obtain location measurement information of the terminal.

S703 includes the following two sub-operations:

S703a: The serving RAN device performs location measurement on the terminal, to obtain location measurement information of the terminal.

S703b: The neighboring-cell RAN device performs location measurement on the terminal, to obtain location measurement information of the terminal.

The serving RAN device and the neighboring-cell RAN device each identify the terminal corresponding to the specified characteristic information in the received location measurement request message, and perform location measurement on the terminal to obtain the location measurement information of the corresponding terminal.

S704: The RAN devices each send a sixth message to the AMF, where the sixth message includes the third information and the location measurement information of the terminal.

S704 includes the following two sub-operations:

S704a: The serving RAN device sends the sixth message to the AMF, where the sixth message includes the third information and the location measurement information of the terminal.

S704b: The neighboring-cell RAN device sends the sixth message to the AMF, where the sixth message includes the third information and the location measurement information of the terminal.

In this embodiment of this application, the sixth message may be terminal-associated new radio positioning protocol annex uplink transport signaling or nonterminal-associated new radio positioning protocol annex uplink transport signaling, or any other message transmitted between the AMF and the radio access network device, or a new-type message agreed on between the AMF and the radio access network device.

In some embodiments of this application, the sixth message sent by the RAN device to the AMF is any one of the following:

(1) the Sixth Message is the Terminal-Associated New Radio Positioning Protocol Annex Uplink Transport Signaling.

The terminal-associated new radio positioning protocol annex uplink transport signaling may be an uplink UE associated NRPPa transport message. The signaling carries at least one of the following: the temporary subscriber identifiers (the AMF UE NGAP ID and the RAN UE NGAP ID) of the terminal, the routing identifier (Routing ID), and the location measurement response message.

In this case, the third information may be the temporary subscriber identifiers carried in the terminal-associated new radio positioning protocol annex uplink transport signaling, and the terminal corresponding to the sixth message can be determined based on the temporary subscriber identifiers.

(2) the Sixth Message is the Nonterminal-Associated New Radio Positioning Protocol Annex Uplink Transport Signaling.

The nonterminal-associated new radio positioning protocol annex uplink transport signaling may be an uplink non UE associated NRPPa transport message. The signaling carries at least one of the third information, the routing identifier (Routing ID), and the location measurement response message. The third information may be the terminal identifier, and the terminal corresponding to the sixth message can be determined based on the subscriber identifier.

S705: The AMF sends second messages to the LMF, where the second message includes second information associated with the terminal and the location measurement information of the terminal.

S705 includes the following two sub-operations:

S705a: The AMF sends the second message to the LMF based on the sixth message received from the serving RAN device, where the second message includes the second information associated with the terminal and the location measurement information of the terminal.

The location measurement information is the location measurement information that is of the terminal and that is obtained by the serving RAN device.

S705b: The AMF sends the second message to the LMF based on the sixth message received from the neighboring-cell RAN device, where the second message includes the second information associated with the terminal and the location measurement information of the terminal.

The location measurement information is the location measurement information that is of the terminal and that is obtained by the neighboring-cell RAN device.

In some embodiments of this application, the second information includes any one or more of the following:
the terminal identifier, the routing identifier, the location service correlation identifier, or the N2 interface notification subscription identifier.

The terminal identifier includes any one or more of the following:
the subscription permanent identifier, the generic public subscription identifier, the permanent equipment identifier, the temporary identifier allocated by the location management function network element to the terminal, the temporary identifier allocated by the access and mobility management network element to the terminal, or the temporary identifier allocated by the radio access network device to the terminal.

For details of information included in the second information, refer to the foregoing description of the first information. Details are not repeated.

In this embodiment of this application, the second message may be N2 interface communication message notification signaling or nonterminal-associated N2 interface communication message notification signaling. Alternatively, the second message may be any other message transmitted between the AMF and the LMF or a new-type message agreed on between the AMF and the LMF.

In some embodiments of this application, the second message sent by the AMF to the LMF is any one of the following:

(1) the Second Message is the N2 Interface Communication Message Notification Signaling.

The N2 interface communication message notification signaling may be an Namf_Communication_N2InfoNotify message. The signaling carries a temporary subscriber identifier, an N2 interface notification message subscription identifier, and the location measurement response message. The temporary subscriber identifier is at least one of the location service correlation identifier (LCS Correlation ID). The LCS correlation ID is allocated by the AMF network element to the terminal and is used to identify a positioning procedure corresponding to the terminal. The location measurement response message includes the location measurement information of the terminal.

In this case, the second information may be the LCS correlation ID carried in the N2 interface communication message notification signaling, and the terminal corresponding to the positioning procedure that corresponds to the second message can be determined based on the LCS correlation ID. Therefore, the terminal corresponding to the second message is determined.

(2) the Second Message is the Nonterminal-Associated N2 Interface Communication Message Notification Signaling.

The nonterminal-associated N2 interface communication message notification signaling may be an Namf_Communication_NonUEN2InfoNotify message. The signaling carries at least one of the N2 interface notification message subscription identifier n2NotifySubscriptionId and the location measurement response message. The location measurement response message includes the location measurement information of the terminal.

In this case, the second information may be the n2NotifySubscriptionId. The subscription identifier is determined by the AMF based on an N1/N2 interface communication message subscription request message that is sent by the LMF in the network assisted positioning procedure, which is a sub-procedure of the network assisted location positioning procedure. The N1/N2 interface communication message subscription request message carries the terminal identifier. Therefore, the subscription identifier corresponds to the subscriber identifier. In other words, the subscription identifier corresponds to the terminal. The terminal corresponding to the second message can be determined based on the subscription identifier.

In some embodiments of this application, before S701 is performed, the following operations may be further performed.

S700a: The LMF sends a third message to the AMF, where the third message is used to subscribe to the location measurement information of the terminal.

In some embodiments of this application, the third message includes the first information. For information included in the first information, refer to the foregoing description of the first information. Details are not described herein.

In this embodiment of this application, the third message may be N1/N2 interface communication message subscription request signaling or nonterminal-associated communication message subscription request signaling, or any other message transmitted between the LMF and the AMF, or a new-type message agreed on between the LMF and the AMF.

In some embodiments of this application, the third message sent by the LMF to the AMF is any one of the following:

(1) the Third Message is the N1/N2 Interface Communication Message Subscription Request Signaling.

The N1/N2 interface communication message subscription request signaling may be an Namf_Communication_N1N2MessageSubscribe Request message. The signaling carries at least one of the terminal identifier (UE ID), the NF instance ID, an N1 message notification callback uniform resource identifier N1NotifyCallbackUri, and the N2 message notification callback uniform resource identifier N2NotifyCallbackUri.

In this case, the first information may be the terminal identifier carried in the N1/N2 interface communication message subscription request signaling, and the terminal corresponding to the first message can be determined based on the subscriber identifier.

(2) the Third Message is the Nonterminal-Associated Communication Message Subscription Request Signaling.

The nonterminal-associated communication message subscription request signaling may be an Namf_Communication_NonUeMessageSubscribe Request message. The signaling carries at least one of the first information, the RAN device identifier list, the NF instance identifier, and the N2 message notification callback uniform resource identifier N2NotifyCallbackUri.

The first information may be the terminal identifier, and the terminal corresponding to the third message can be determined based on the subscriber identifier.

S700b: The AMF sends a fourth message to the LMF, where the fourth message is used to notify that subscription to the location measurement information is successful.

In some embodiments of this application, the fourth message includes the second information. For information included in the second information, refer to the foregoing description of the second information. Details are not described herein.

In this embodiment of this application, the fourth message may be N1/N2 interface communication message subscription response signaling or nonterminal-associated communication message subscription response signaling, or any other message transmitted between the AMF and the LMF, or a new-type message agreed on between the AMF and the LMF.

In some embodiments of this application, the fourth message sent by the AMF to the LMF is any one of the following:

(1) the Fourth Message is the N1/N2 Interface Communication Message Subscription Response Signaling.

The N1/N2 interface communication message subscription response signaling may be an Namf_Communication_N1N2MessageSubscribe Response message. The signaling carries an N1/N2 interface notification subscription identifier n1n2NotifySubscriptionId.

In this case, the first information may be the N2 interface notification subscription identifier that corresponds to the terminal and that is carried in the N1/N2 interface communication message transfer signaling. The terminal corresponding to the fourth message can be determined based on the subscription identifier.

(2) the Fourth Message is the Nonterminal-Associated Communication Message Subscription Response Signaling.

The nonterminal-associated communication message subscription response signaling may be an Namf_Communication_NonUeMessageSubscribe Response message. The signaling carries the N2 interface notification subscription identifier n2NotifySubscriptionId.

The first information may be the N2 interface notification subscription identifier. The N2 interface notification subscription identifier is determined by the AMF based on the third message sent by the LMF, and the third message includes the terminal identifier. Therefore, the N2 interface notification subscription identifier corresponds to the subscriber identifier. In other words, the N2 interface notification subscription identifier corresponds to the terminal. Therefore, the terminal corresponding to the fourth message can be determined based on the first information.

In some embodiments of this application, each of the first information, the second information, and the third information may be a newly added information element in a corresponding message in each of the foregoing operations, or may be added to any existing information element in a corresponding message.

In the foregoing embodiment, a message that is related to terminal location measurement and that is sent among the RAN device, the AMF, and the LMF is changed to a subscriber-level message, or a subscriber-level identifier is carried in a network element-level message. In this way, a terminal corresponding to a message sent in the procedure for obtaining nonterminal-associated network assistance data can be determined based on a terminal identifier carried in the subscriber-level message or the subscriber-level identifier. Therefore, in this procedure, the LMF can determine a terminal corresponding to received location measurement information and can concurrently perform, when obtaining location measurement information of a terminal served by a base station, location measurement on another terminal served by the base station.

S700a and S700b are utilized in some embodiments. Therefore, dashed lines are used in FIG. 7 to represent S700a and S700b.

It should be noted that operation numbers in the procedure described in this embodiment of this application are merely examples of an execution procedure, and do not constitute a limitation on an execution sequence of the operations. In this embodiment of this application, there is no strict execution sequence between operations that are independent of each other in a time sequence. For example, when the AMF performs S705a and S705b, if the AMF first receives the sixth message sent by the serving RAN device, S705a is first performed. Alternatively, if the AMF first receives the sixth message sent by the neighboring-cell RAN device, S705b is first performed.

It should be understood that the message and the signaling described in this embodiment of this application have a same meaning, and may be used interchangeably.

Embodiment 1

Figure 8A:
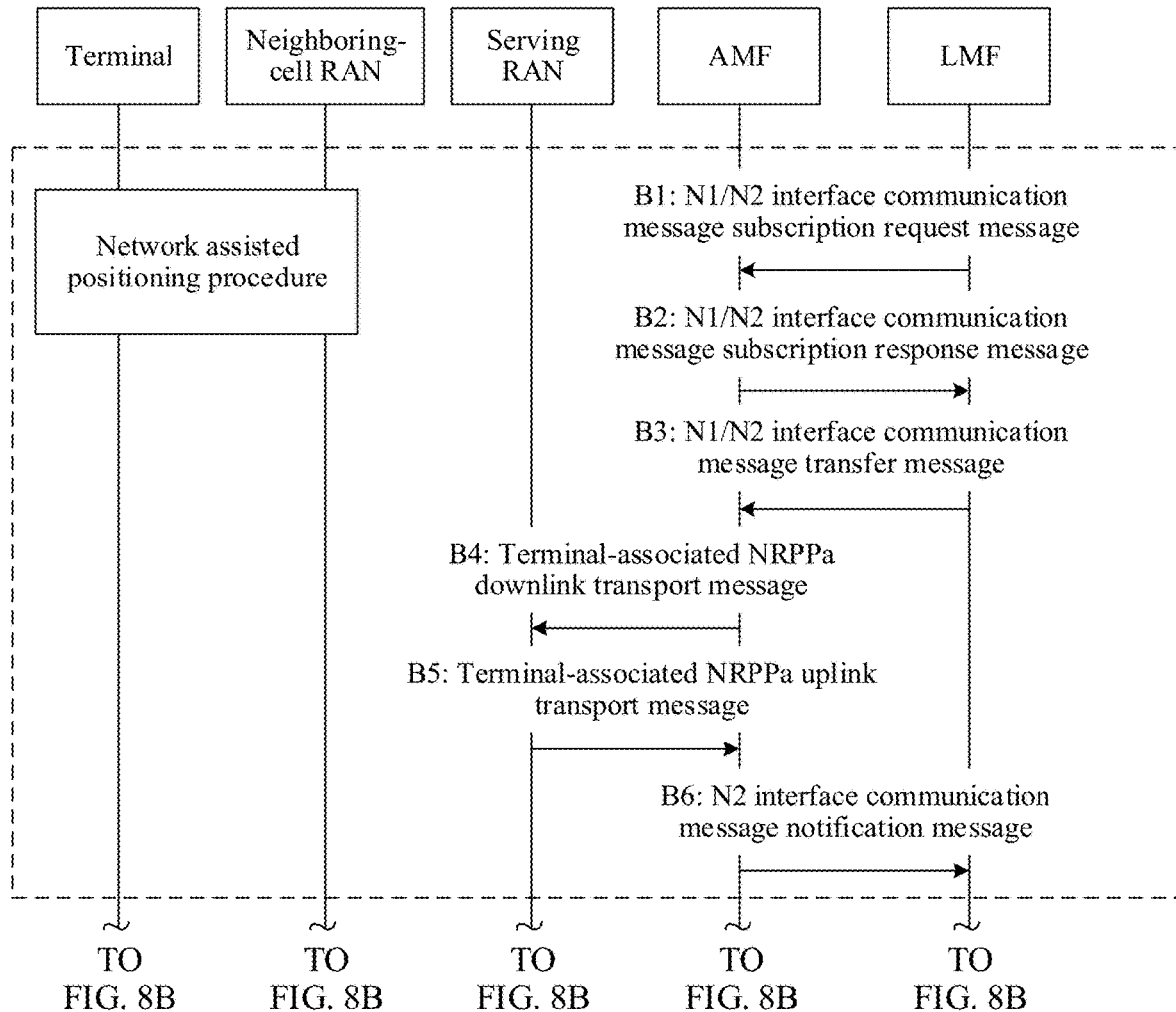
FIG. 8A and FIG. 8B are a schematic diagram depicting procedures and signaling interaction of a communication method according to an embodiment of this application.
Figure 8B:
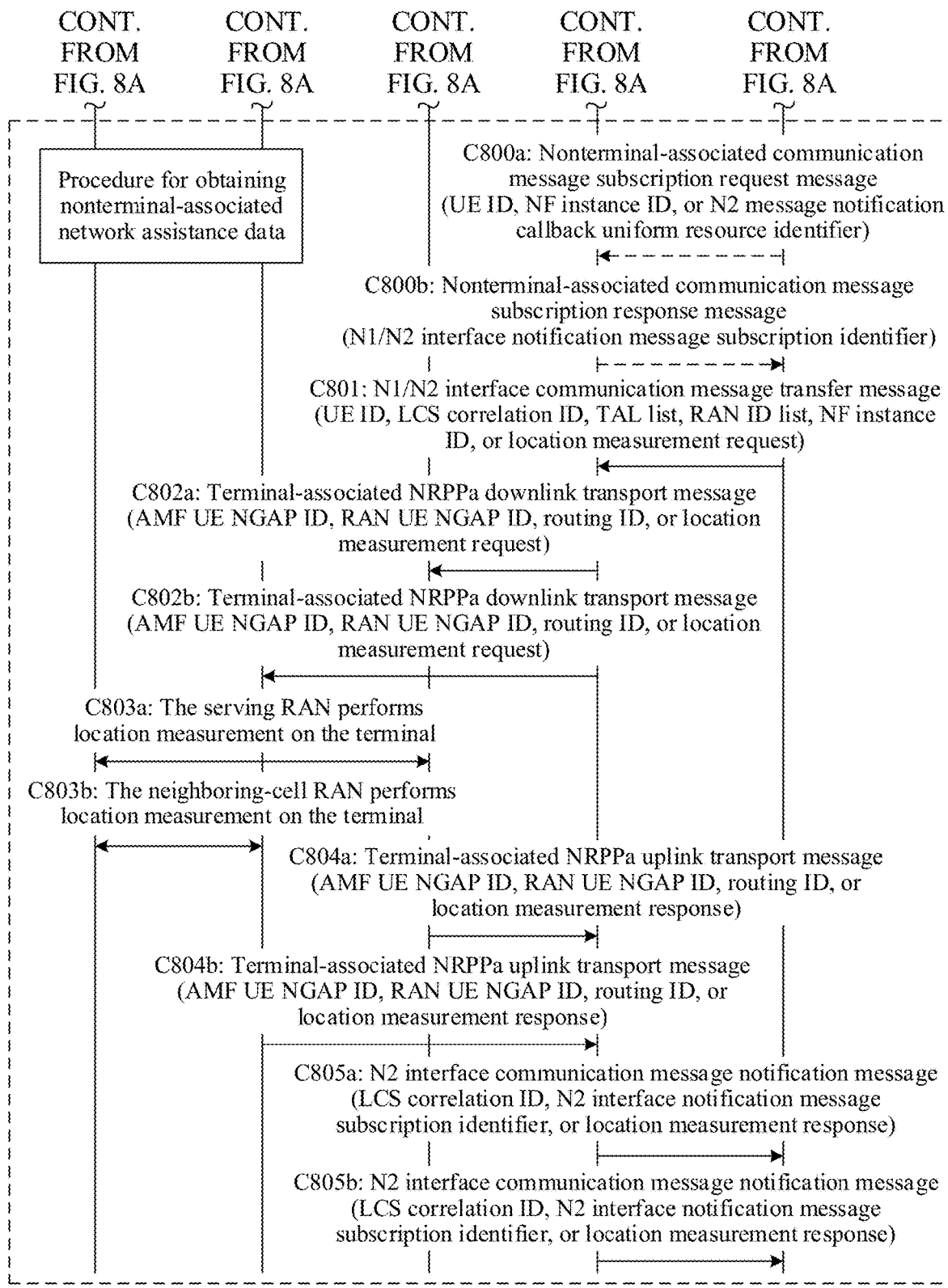

FIG. 8A and FIG. 8B are a schematic diagram depicting procedures and signaling interaction of a communication method according to an embodiment of this application. As shown in the figure, the procedures include a network assisted positioning procedure and a procedure for obtaining nonterminal-associated network assistance data.

The network assisted positioning procedure is the same as the network assisted positioning procedure shown in FIG. 6A and FIG. 6B. Details are not repeated herein.

The procedure for obtaining nonterminal-associated network assistance data includes the following operations.

Operation C801: An LMF sends an N1/N2 interface communication message transfer message to an AMF.

The LMF sends the N1/N2 interface communication message transfer message (Namf_Communication_N1N2-MessageTransfer) to the AMF based on positioning assistance information in a positioning information response message received in operation B6 in the network assisted positioning procedure. The N1/N2 interface communication message transfer message carries at least one of a terminal identifier (UE ID), an LCS correlation ID, a tracking area identifier list, an identifier list of RAN devices that need to participate in location measurement, an NF instance ID, and a location measurement request message.

The location measurement request message includes assistance information such as an SRS configuration. The assistance information includes specified characteristic information of the terminal, and is used by the RAN device to identify the terminal corresponding to the characteristic information and perform location measurement on the terminal.

The RAN devices that need to participate in measurement include a serving RAN device, and may further include a neighboring-cell RAN device of the serving RAN device. The serving RAN device is a RAN device that manages a serving cell of the terminal, and the neighboring-cell RAN device is a RAN device that manages a neighboring cell of the serving cell.

Operation C802: The AMF sends a terminal-associated NRPPa downlink transport message to each of the serving RAN device and the neighboring-cell RAN device.

As shown in FIG. 8A and FIG. 8B, operation C802 includes the following two sub-operations:

Operation C802a: The AMF sends the terminal-associated NRPPa downlink transport message to the serving RAN device.

Operation C802b: The AMF sends the terminal-associated NRPPa downlink transport message to the neighboring-cell RAN device.

In operation C802, the AMF sends, based on a tracking area identifier carried in the Namf_Communication_N1N2MessageTransfer message or RAN device identifiers and the subscriber identifier that are carried in the Namf_Communication_N1N2Message- Transfer message in operation C801, the terminal-associated NRPPa downlink transport (Downlink UE associated NRPPa Transport) message to each of the RAN devices that participate in location measurement. The terminal-associated NRPPa downlink transport message carries at least one of the location measurement request message, temporary subscriber identifiers (an AMF UE NGAP ID and a RAN UE NGAP ID), and a routing ID.

Operation C803: The serving RAN device and the neighboring-cell RAN device each perform location measurement on the terminal.

As shown in FIG. 8A and FIG. 8B, operation C803 includes the following two sub-operations:

Operation C803a: The serving RAN device performs location measurement on the terminal.

Operation C803b: The neighboring-cell RAN device performs location measurement on the terminal.

An execution process of operation C803 is the same as that of operation C5 shown in FIG. 6A and FIG. 6B, and details are not repeated herein.

Operation C804: The serving RAN device and the neighboring-cell RAN device each send a terminal-associated NRPPa uplink transport message to the AMF.

As shown in FIG. 8A and FIG. 8B, operation C804 includes the following two sub-operations:

Operation C804a: The serving RAN device sends the terminal-associated NRPPa uplink transport message to the AMF.

Operation C804b: The neighboring-cell RAN device sends the terminal-associated NRPPa uplink transport message to the AMF.

In operation C804, after the location measurement in operation C803 is completed, the serving RAN device and the neighboring-cell RAN device each send the terminal-associated NRPPa uplink transport (Uplink UE associated NRPPa Transport) message to the AMF. The message carries at least one of a location measurement response message, the temporary subscriber identifiers (the AMF UE NGAP ID and the RAN UE NGAP ID), and the routing ID that is obtained in operation C802. The location measurement response message includes location measurement information obtained through location measurement performed in C803.

Operation C805: The AMF sends nonterminal-associated N2 interface communication message notification messages to the LMF.

As shown in FIG. 8A and FIG. 8B, operation C805 includes the following two sub-operations:

Operation C805a: The AMF sends the N2 interface communication message notification message to the LMF based on the terminal-associated NRPPa uplink transport message sent by the serving RAN device.

Operation C805b: The AMF sends the N2 interface communication message notification message to the LMF based on the terminal-associated NRPPa uplink transport message sent by the neighboring-cell RAN device.

In operation C805, after receiving the terminal-associated NRPPa uplink transport message sent by the serving RAN device or the neighboring-cell RAN device, the AMF finds a corresponding N2NotifyCallbackUri based on the temporary subscriber identifiers carried in the message. The N2NotifyCallbackUri indicates an N2 message notification callback address of the LMF. Then, the AMF sends the N2 interface communication message notification (Namf_Communication_N2InfoNotify) message to the LMF, where the message includes at least one of a temporary subscriber identifier, an N2 interface notification message subscription identifier, and a location measurement response message. The temporary subscriber identifier is an LCS correlation ID. The LCS correlation ID is allocated by the AMF network element to the terminal and is used to identify a positioning procedure corresponding to the terminal. The location measurement response message includes the location measurement information.

In some embodiments, subscription information created in operation B1 and operation B2 continues to be used in operation S801.

In some embodiments, before operation S801, the LMF creates new subscription information for the AMF, and the following operations are included:

Operation C800a: The LMF sends an N1/N2 interface communication message subscription request message to the AMF.

When determining, based on an LCS capability of the terminal and local configurations, to perform the network assisted location positioning procedure, the LMF sends the N1/N2 interface communication message subscription request (Namf_Communication_N1N2MessageSubscribe Request) message to the AMF, to subscribe to, from the AMF, a message notification transmitted through an N1 interface (a signaling message interface between UE and the AMF) message notification or an N2 interface (a signaling message interface between the RAN and the AMF). The request message includes at least one of the terminal identifier (UE ID), the NF instance ID, and the N2 message notification callback uniform resource identifier N2NotifyCallbackUri, where the N2NotifyCallbackUri corresponds to the terminal.

Operation C800b: The AMF sends an N1/N2 interface communication message subscription response message to the LMF.

The AMF determines whether the subscriber is legitimate based on the terminal identifier. If the subscriber is registered with the AMF, the AMF stores subscription information, generates a corresponding subscription identifier n1n2NotifySubscriptionId, and returns the identifier to the LMF by using the N1/N2 interface communication message subscription response (Namf_Communication_N1N2MessageSubscribe Response) message. The N1/N2 interface communication message subscription response message includes the N1/N2 interface notification message subscription identifier n1n2NotifySubscriptionId, where the n1n2NotifySubscriptionId corresponds to the terminal.

After obtaining the location measurement information, the LMF may calculate location information of the terminal based on the location measurement information.

In the foregoing embodiment, a location measurement-related message transmitted among the RAN device, the AMF, and the LMF is subscriber-level signaling, and the subscriber-level signaling includes a terminal identifier. This ensures that the RAN device, the AMF, and the LMF each can determine, based on a terminal identifier in a received signaling message, a terminal corresponding to the received information in the procedure for obtaining nonterminal-associated network assistance data. Therefore, the RAN device, the AMF, and the LMF can determine a terminal corresponding to a received or sent message without the need to perform the entire procedure. This improves efficiency of determining a target object. In addition, in the foregoing embodiment, a terminal corresponding to a subscriber-level signaling message can be determined based on terminal identifier information carried in the signaling message, and the entire procedure does not need to correspond to the terminal. Therefore, the LMF can concurrently perform positioning on multiple terminals served by a RAN device. This greatly improves terminal positioning efficiency.

Embodiment 2

Figure 9A:
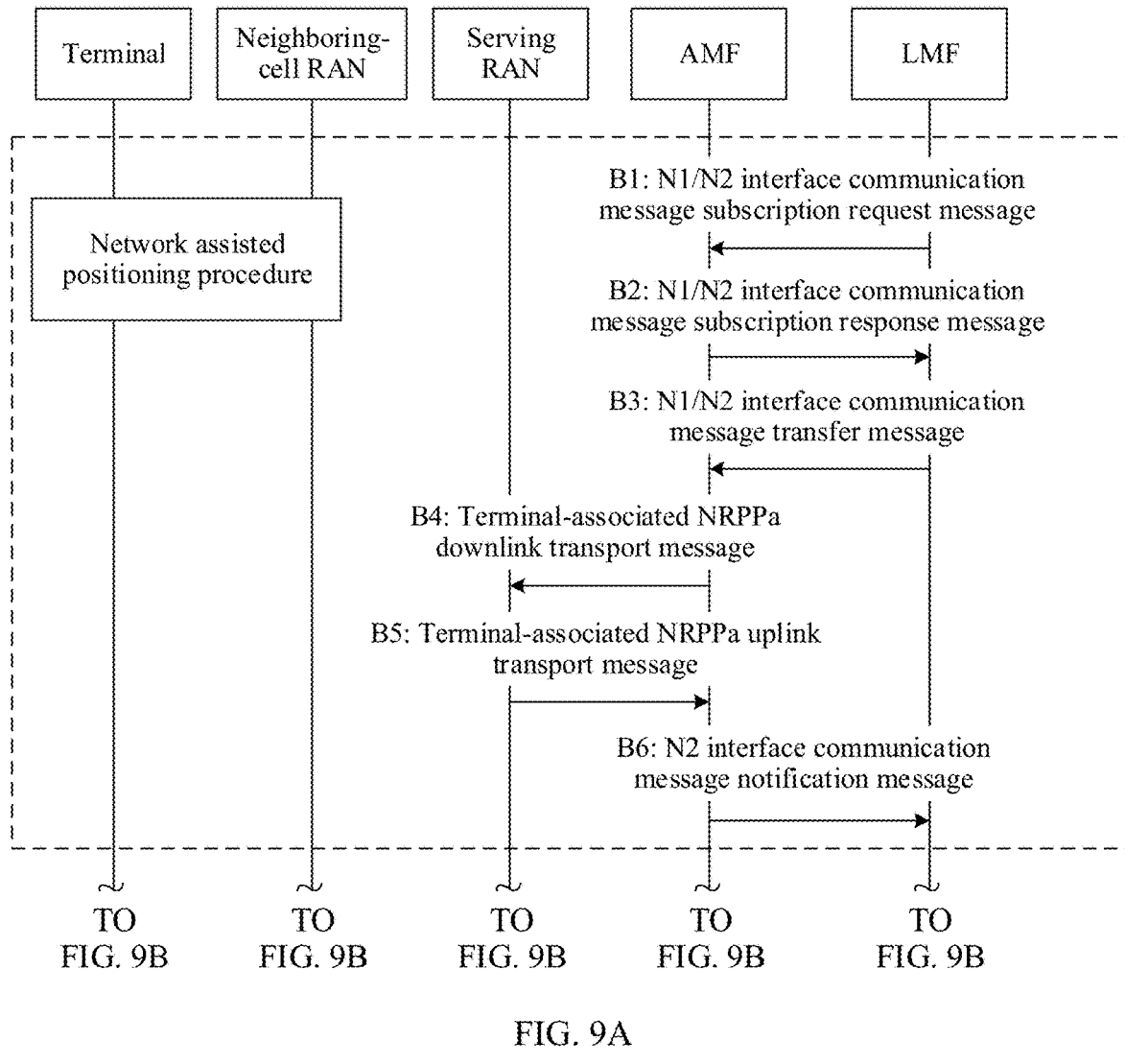
FIG. 9A and FIG. 9B are a schematic diagram depicting procedures and signaling interaction of another communication method according to an embodiment of this application.
Figure 9B:
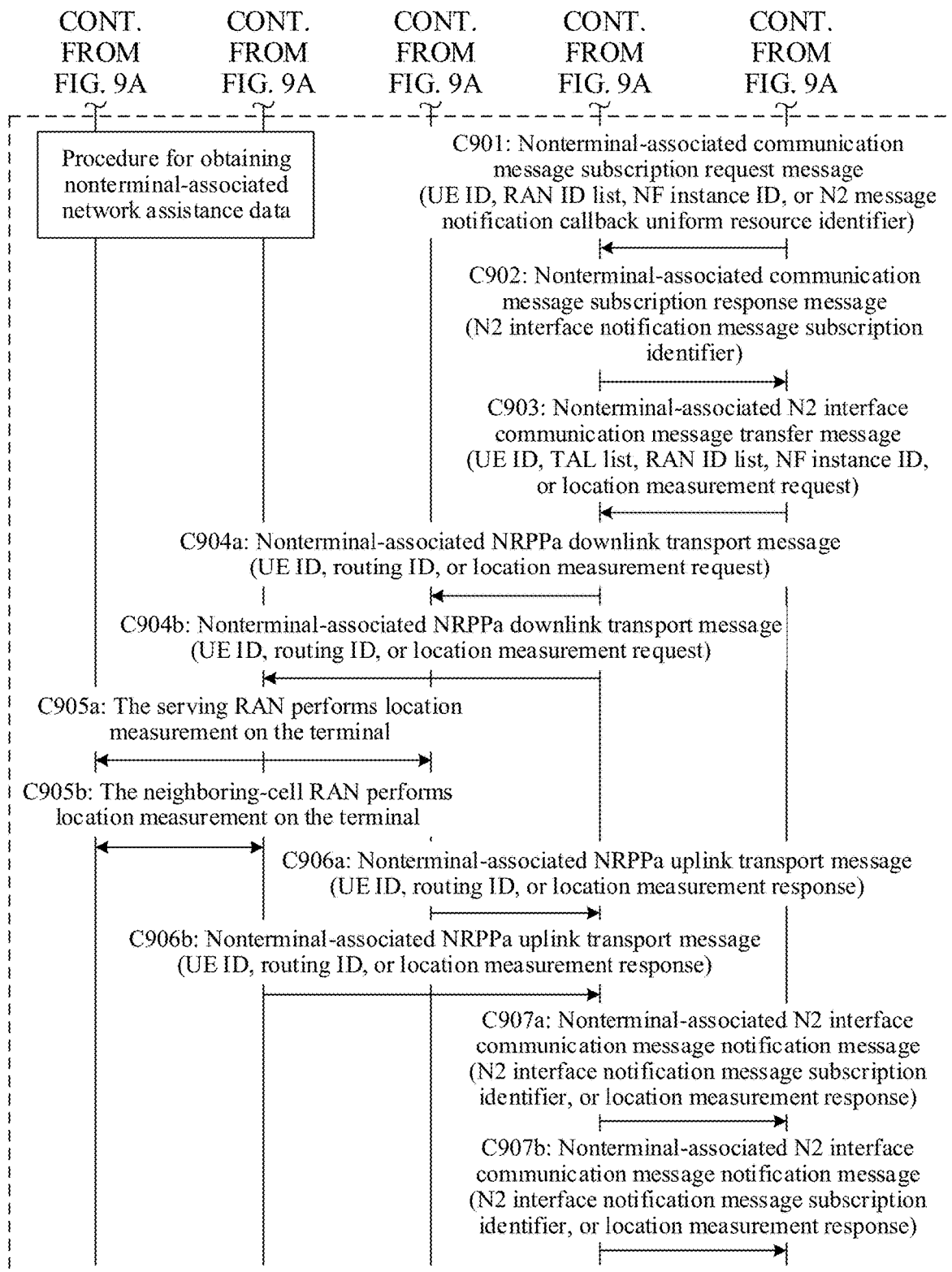

FIG. 9A and FIG. 9B are a schematic diagram depicting procedures and signaling interaction of another communication method according to an embodiment of this application. As shown in the figure, the procedures include a network assisted positioning procedure and a procedure for obtaining nonterminal-associated network assistance data.

The network assisted positioning procedure is the same as the network assisted positioning procedure shown in FIG. 6A and FIG. 6B. Details are not repeated herein.

The procedure for obtaining nonterminal-associated network assistance data includes the following operations.

Operation C901: An LMF sends a nonterminal-associated communication message subscription request message to an AMF.

The LMF selects, based on information obtained in operation B6, RAN devices participating in positioning a terminal, and sends the nonterminal-associated communication message subscription request (Namf_Communication_NonUeMessageSubscribe Request) message to subscribe to, from the AMF, a message notification transmitted through an N2 interface (a signaling message interface between the RAN and the AMF). The nonterminal-associated communication message subscription request message carries at least one of a terminal identifier (UE ID), a RAN device identifier list (RAN ID List), an NF instance identifier (NF Instance ID), and an N2 message notification callback uniform resource identifier N2NotifyCallbackUri.

The subscriber identifier may be a newly added information element (as shown in FIG. 9A and FIG. 9B) in the nonterminal-associated communication message subscription request message, or may be added to any information element in the nonterminal-associated communication message subscription request message. For example, the subscriber identifier is added to an information element of the NF instance ID.

Operation C902: The AMF sends a nonterminal-associated communication message subscription response message to the LMF.

The AMF determines, based on the RAN ID list, whether a link has been established between each RAN device in the list and the AMF. If a link has been established between each RAN device in the list and the AMF, the AMF stores subscription information, generates a corresponding subscription identifier n2NotifySubscriptionId, and returns the identifier to the LMF by using the nonterminal-associated communication message subscription response (Namf_Communication_NonUeMessageSubscribe Response) message.

Operation C903: The LMF sends a nonterminal-associated N2 interface communication message transfer message to the AMF.

The LMF sends the nonterminal-associated N2 interface communication message transfer (Namf_Communication_NonUeN2MessageTransfer) message to the AMF based on positioning assistance information in a positioning information response message received in operation B6. The nonterminal-associated N2 interface communication message transfer message carries at least one of the terminal identifier, a tracking area identifier list (TAL list), an identifier list of RAN devices that need to participate in location measurement, the NF instance identifier, and location measurement request information. The location measurement request message includes assistance information such as an SRS configuration. The assistance information includes specified characteristic information of the terminal, and is used by the RAN device to identify the terminal having the characteristic information and perform location measurement on the terminal.

The RAN devices that need to participate in measurement include a serving RAN device and a neighboring-cell RAN device of the serving RAN device.

The subscriber identifier may be a newly added information element (as shown in FIG. 9A and FIG. 9B) in the nonterminal-associated N2 interface communication message transfer message, or may be added to any information element in the nonterminal-associated N2 interface communication message transfer message. For example, the subscriber identifier is added to an information element of the NF instance ID.

Operation C904: The AMF sends a nonterminal-associated NRPPa downlink transport message to each of the serving RAN device and the neighboring-cell RAN device.

As shown in FIG. 9A and FIG. 9B, operation C904 includes the following two sub-operations:

Operation C904a: The AMF sends the nonterminal-associated NRPPa downlink transport message to the serving RAN device.

Operation C904b: The AMF sends the nonterminal-associated NRPPa downlink transport message to the neighboring-cell RAN device.

In operation C904, the AMF sends, based on the tracking area identifier list carried in the nonterminal-associated NRPPa downlink transport (Namf_Communication_NonUeN2MessageTransfer) message or the identifier list that is of RAN devices that need to participate in location measurement and that is carried in the nonterminal-associated NRPPa downlink transport (Namf_Communication_NonUeN2MessageTransfer) in operation C903, the nonterminal-associated NRPPa downlink transport message (Downlink NonUe associated NRPPa Transport) to each of the RAN devices that participate in location measurement. The nonterminal-associated NRPPa downlink transport message carries at least one or the terminal identifier, the location measurement request message, and a routing identifier (Routing ID).

The subscriber identifier may be a newly added information element (as shown in FIG. 9A and FIG. 9B) in the nonterminal-associated NRPPa downlink transport message, or may be added to any information element in the nonterminal-associated NRPPa downlink transport message transmission message. For example, the subscriber identifier is added to an information element of the routing ID.

Operation C905: The serving RAN device and the neighboring-cell RAN device each perform location measurement on the terminal.

As shown in FIG. 9A and FIG. 9B, operation C905 includes the following two sub-operations:

Operation C905a: The serving RAN device performs location measurement on the terminal.

Operation C905b: The neighboring-cell RAN device performs location measurement on the terminal.

An execution process of operation C905 is the same as that of operation C5 shown in FIG. 6A and FIG. 6B, and details are not repeated herein.

Operation C906: The serving RAN device and the neighboring-cell RAN device each send a nonterminal-associated NRPPa uplink transport message to the AMF.

As shown in FIG. 9A and FIG. 9B, operation C906 includes the following two sub-operations:

Operation C906a: The serving RAN device sends the nonterminal-associated NRPPa uplink transport message to the AMF.

Operation C906b: The neighboring-cell RAN device sends the nonterminal-associated NRPPa uplink transport message to the AMF.

In operation C906, after the location measurement in operation C905 is completed, the serving RAN device and the neighboring-cell RAN device each send the (Uplink Non UE associated NRPPa Transport) message to the AMF. The nonterminal-associated NRPPa uplink transport message carries at least one of the terminal identifier, a location measurement response message, and the routing ID obtained in operation C904. The location measurement response message includes location measurement information obtained through location measurement performed on the terminal.

The subscriber identifier may be a newly added information element (as shown in FIG. 9A and FIG. 9B) in the nonterminal-associated NRPPa uplink transport message, or may be added to any information element in the nonterminal-associated NRPPa uplink transport message transmission message. For example, the subscriber identifier is added to an information element of the routing ID.

Operation C907: The AMF sends nonterminal-associated N2 interface communication message notification messages to the LMF.

As shown in FIG. 9A and FIG. 9B, operation C907 includes the following two sub-operations:

Operation C907a: The AMF sends the nonterminal-associated N2 interface communication message notification message to the LMF based on the nonterminal-associated NRPPa uplink transport message sent by the serving RAN device.

Operation C907b: The AMF sends the nonterminal-associated N2 interface communication message notification message to the LMF based on the nonterminal-associated NRPPa uplink transport message sent by the neighboring-cell RAN device.

In operation C907, after receiving the nonterminal-associated NRPPa uplink transport message sent by the serving RAN device or the neighboring-cell RAN device, the AMF finds a corresponding N2NotifyCallbackUri based on the routing ID carried in the message. The N2NotifyCallbackUri indicates an N2 message notification callback address of the LMF. Then, the AMF returns the location measurement information to the LMF by using the location measurement response message carried in the Namf_Communication_NonUEN2InfoNotify message. The nonterminal-associated NRPPa uplink transport message carries at least one of the N2 interface notification message subscription identifier n2NotifySubscriptionId and the location measurement response message.

The subscription request message sent by the LMF to the AMF in operation C901 carries the terminal identifier. Therefore, the subscription identifier n2NotifySubscriptionId generated by the AMF based on the subscription request message corresponds to the terminal. In operation C907, the nonterminal-associated NRPPa uplink transport message received by the LMF and sent by the AMF carries the n2NotifySubscriptionId. Therefore, the LMF can determine that the location measurement information carried in the nonterminal-associated NRPPa uplink transport message is data corresponding to the terminal.

In this embodiment, the subscriber identifier is a permanent subscriber identifier, such as an SUPI, a GPSI, or a PEI, of terminal; a temporary identifier, such as an LCS correlation ID or a subscription ID, of the terminal; or a unique identifier allocated by the LMF to the terminal.

After obtaining the location measurement information, the LMF may calculate location information of the terminal based on the location measurement information.

In the foregoing embodiment, a subscriber-level identifier is added to a network element-level message that is related to location measurement and that is transmitted among the RAN device, the AMF, and the LMF. This ensures that the RAN device, the AMF, and the LMF each can determine, based on a terminal identifier in a received signaling message, a terminal corresponding to the received information. Therefore, the RAN device, the AMF, and the LMF can determine a terminal corresponding to a received or sent message without the need to perform the entire procedure. This improves efficiency of determining a target object. In addition, in the foregoing embodiment, a terminal corresponding to a network element-level signaling message can be determined based on terminal identifier information added to the signaling message, and the entire procedure does not need to correspond to the terminal. Therefore, the LMF can concurrently perform positioning on multiple terminals served by a RAN device. This greatly improves terminal positioning efficiency.

Embodiment 3

Figure 10A:
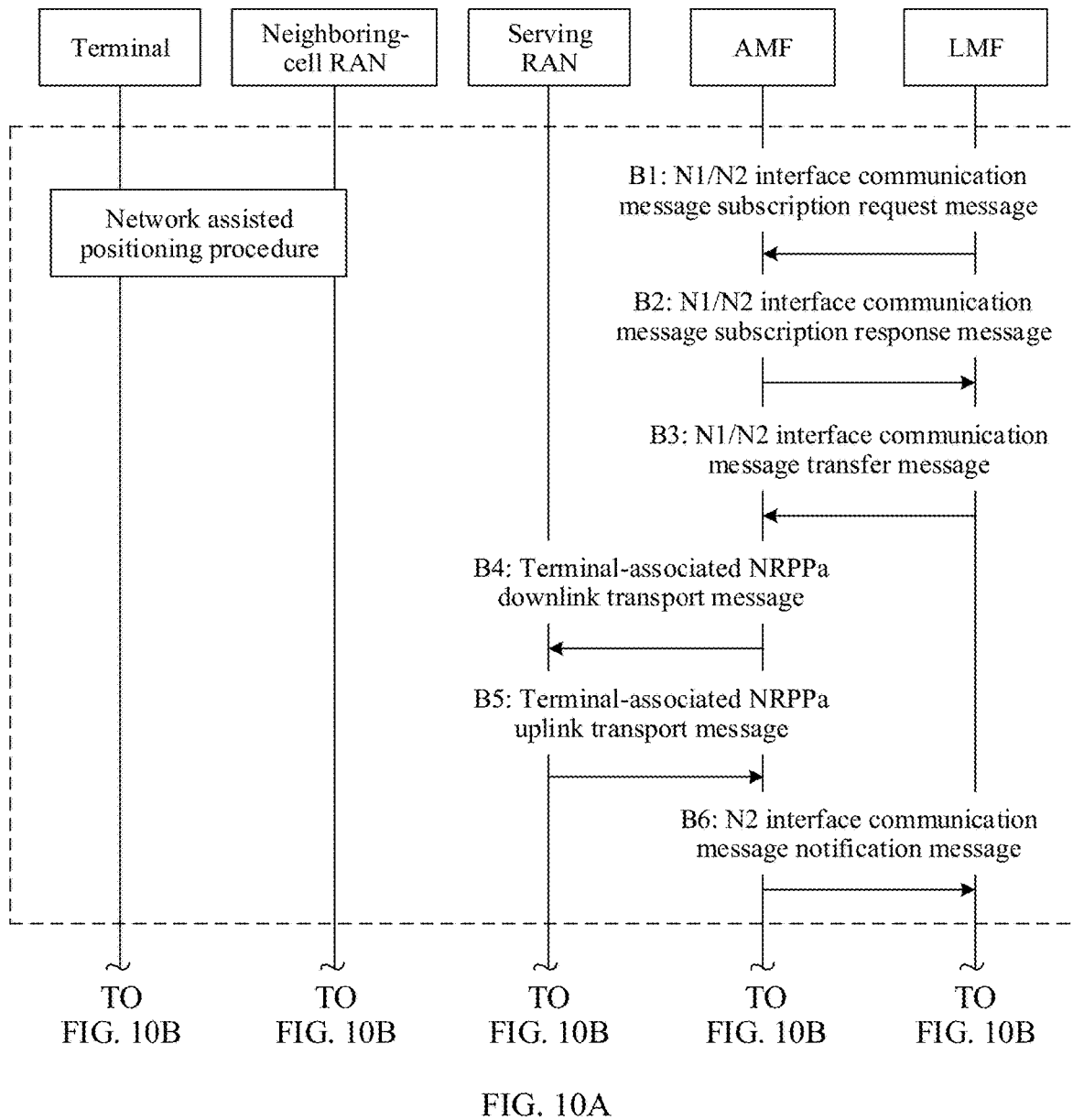
FIG. 10A and FIG. 10B are a schematic diagram depicting procedures and signaling interaction of still another communication method according to an embodiment of this application.
Figure 10B:
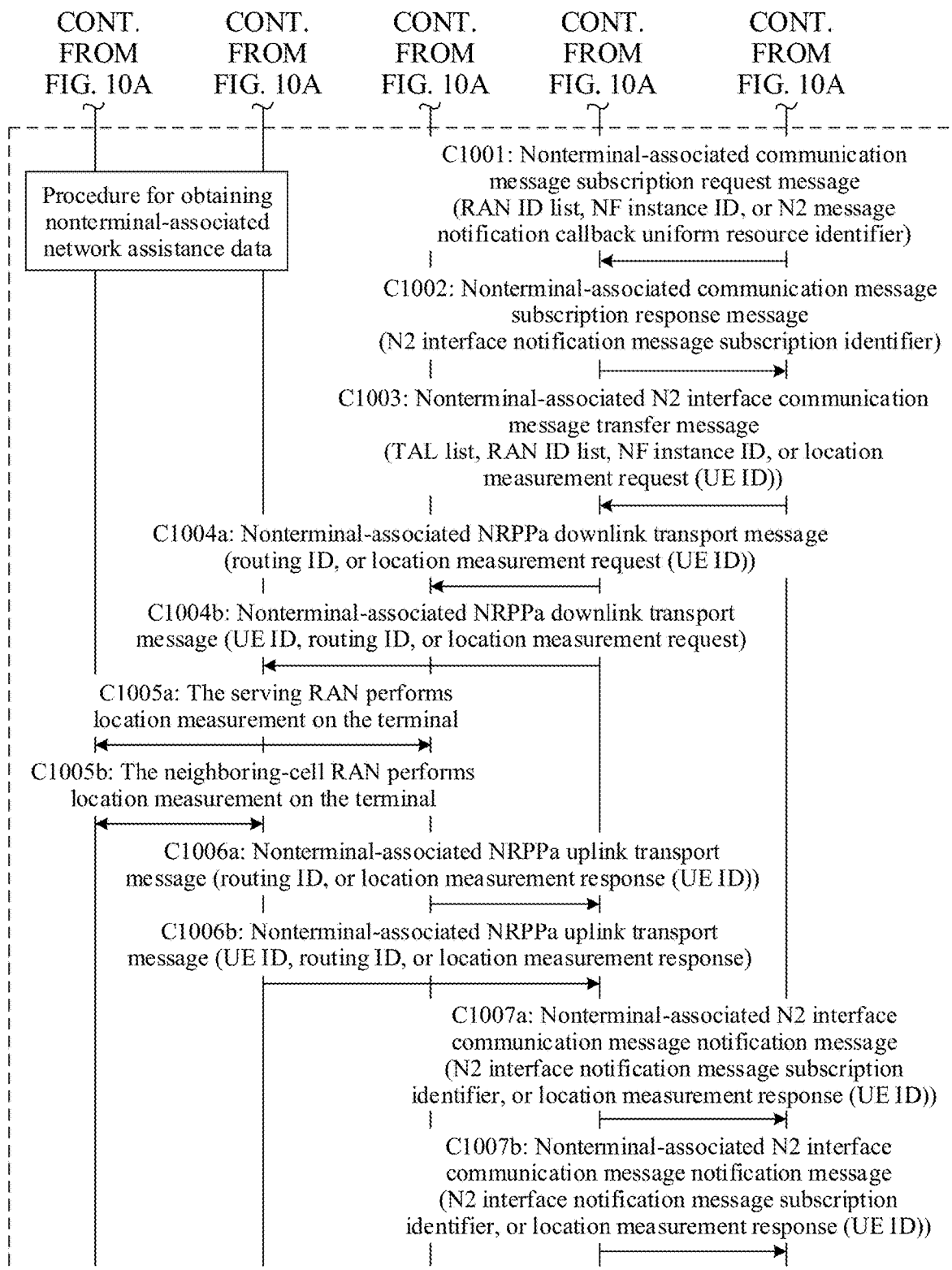

FIG. 10A and FIG. 10B are a schematic diagram depicting procedures and signaling interaction of still another communication method according to an embodiment of this application. As shown in the figure, the procedures include a network assisted positioning procedure and a procedure for obtaining nonterminal-associated network assistance data.

The network assisted positioning procedure is the same as the network assisted positioning procedure shown in FIG. 6A and FIG. 6B. Details are not repeated herein.

The procedure for obtaining nonterminal-associated network assistance data includes the following operations.

Operation C1001: An LMF sends a nonterminal-associated communication message subscription request message to an AMF.

The LMF selects, based on information obtained in operation B6, a RAN device participating in positioning a terminal, and sends the nonterminal-associated communication message subscription request (Namf_Communication_Non- UeMessageSubscribe Request) message to subscribe to, from the AMF, a message notification transmitted through an N2 interface (a signaling message interface between the RAN and the AMF). The nonterminal-associated communication message subscription request message carries at least one of a RAN device identifier list (RAN ID List), an NF instance identifier (NF Instance ID), and an N2 message notification callback uniform resource identifier N2NotifyCallbackUri.

Operation C1002: The AMF sends a nonterminal-associated communication message subscription response message to the LMF.

The AMF determines, based on the RAN ID list, whether a link has been established between each RAN device in the list and the AMF. If a link has been established between each RAN device in the list and the AMF, the AMF stores subscription information, generates a corresponding subscription identifier n2NotifySubscriptionId, and returns the identifier to the LMF by using the nonterminal-associated communication message subscription response (Namf_Communication_NonUeMessageSubscribe Response) message.

Operation C1003: The LMF sends a nonterminal-associated N2 interface communication message transfer message to the AMF.

The LMF sends the nonterminal-associated N2 interface communication message transfer (Namf_Communication_NonUeN2MessageTransfer) message to the AMF based on positioning assistance information in a positioning information response message received in operation B6. The nonterminal-associated N2 interface communication message transfer message carries at least one of a tracking area identifier list (TAL list), an identifier list of RAN devices that need to participate in location measurement, the NF instance ID, and location measurement request information. The location measurement request message includes a terminal identifier. The location measurement request message further includes assistance information such as an SRS configuration. The assistance information includes specified characteristic information of the terminal, and is used by the RAN device to identify the terminal having the characteristic information and perform location measurement on the terminal.

The RAN devices that need to participate in measurement include a serving RAN device and a neighboring-cell RAN device of the serving RAN device.

Operation C1004: The AMF sends a nonterminal-associated NRPPa downlink transport message to each of the serving RAN device and the neighboring-cell RAN device.

As shown in FIG. 10A and FIG. 10B, operation C1004 includes the following two sub-operations:

Operation C1004a: The AMF sends the nonterminal-associated NRPPa downlink transport message to the serving RAN device.

Operation C1004b: The AMF sends the nonterminal-associated NRPPa downlink transport message to the neighboring-cell RAN device.

In operation C1004, the AMF sends, based on the tracking area identifier list carried in the nonterminal-associated NRPPa downlink transport (Namf_Communication_NonUeN2MessageTransfer) message or the identifier list that is of RAN devices that need to participate in location measurement and that is carried in the nonterminal-associated NRPPa downlink transport (Namf_Communication_NonUeN2MessageTransfer) message in operation C1003, the nonterminal-associated NRPPa downlink transport (Downlink NonUe associated NRPPa Transport) message to each of the RAN devices that participate in location measurement. The nonterminal-associated NRPPa downlink transport message carries at least one of the location measurement request message and a routing ID. The location measurement request message includes the terminal identifier.

Operation C1005: The serving RAN device and the neighboring-cell RAN device each perform location measurement on the terminal.

As shown in FIG. 10A and FIG. 10B, operation C1005 includes the following two sub-operations:

Operation C1005a: The serving RAN device performs location measurement on the terminal.

Operation C1005b: The neighboring-cell RAN device performs location measurement on the terminal.

An execution process of operation C1005 is the same as that of Operation C5 shown in FIG. 6A and FIG. 6B, and details are not repeated herein.

Operation C1006: The serving RAN device and the neighboring-cell RAN device each send a nonterminal-associated NRPPa uplink transport message to the AMF.

As shown in FIG. 10A and FIG. 10B, operation C1006 includes the following two sub-operations:

Operation C1006a: The serving RAN device sends the nonterminal-associated NRPPa uplink transport message to the AMF.

Operation C1006b: The neighboring-cell RAN device sends the nonterminal-associated NRPPa uplink transport message to the AMF.

In operation C1006, after the location measurement in operation C1005 is completed, the serving RAN device and the neighboring-cell RAN device each send the uplink non UE associated NRPPa transport message to the AMF. The message carries at least one of a location measurement response message and the routing ID obtained in operation C1004. The location measurement response message includes location measurement information obtained through location measurement performed on the terminal, and further includes the terminal identifier.

Operation C1007: The AMF sends nonterminal-associated N2 interface communication message notification messages to the LMF.

As shown in FIG. 10A and FIG. 10B, operation C1007 includes the following two sub-operations:

Operation C1007a: The AMF sends the nonterminal-associated N2 interface communication message notification message to the LMF based on the nonterminal-associated NRPPa uplink transport message sent by the serving RAN device.

Operation C1007b: The AMF sends the nonterminal-associated N2 interface communication message notification message to the LMF based on the nonterminal-associated NRPPa uplink transport message sent by the neighboring-cell RAN device.

In operation C1007, after receiving the nonterminal-associated NRPPa uplink transport message sent by the serving RAN device or the neighboring-cell RAN device, the AMF finds a corresponding N2NotifyCallbackUri based on the routing ID carried in the message. The N2NotifyCallbackUri indicates an N2 message notification callback address of the LMF. Then, the AMF returns the location measurement information to the LMF by using the location measurement response message carried in the Namf_Communication_NonUEN2InfoNotify message. The nonterminal-associated NRPPa uplink transport message carries at least one of the N2 interface notification message subscription identifier n2NotifySubscriptionId and the location measurement response message. The location measurement response message further includes the terminal identifier.

In this embodiment, the subscriber identifier is a permanent subscriber identifier, such as an SUPI, a GPSI, or a PEI, of terminal; a temporary identifier, such as an LCS correlation ID or a subscription ID, of the terminal; or a unique identifier allocated by the LMF to the terminal.

The subscriber identifier may be a newly added information element in a message corresponding to each of the foregoing operations, or may be added to any information element in a corresponding message. For example, the subscriber identifier is added to an information element location measurement request message or the location measurement response message (as shown in FIG. 10A and FIG. 10B).

After obtaining the location measurement information, the LMF may calculate location information of the terminal based on the location measurement information.

In the foregoing embodiment, a subscriber-level identifier is added to a network element-level message that is related to location measurement and that is transmitted among the RAN device, the AMF, and the LMF. This ensures that the RAN device, the AMF, and the LMF each can determine, based on a terminal identifier in a received signaling message, a terminal corresponding to the received information. Therefore, the RAN device, the AMF, and the LMF can determine a terminal corresponding to a received or sent message without the need to perform the entire procedure. This improves efficiency of determining a target object. In addition, in the foregoing embodiment, a terminal corresponding to a network element-level signaling message can be determined based on terminal identifier information added to the signaling message, and the entire procedure does not need to correspond to the terminal. Therefore, the LMF can concurrently perform positioning on multiple terminals served by a RAN device. This greatly improves terminal positioning efficiency.

The foregoing mainly describes the solutions provided in embodiments of this application from a perspective of interaction among the LMF, the AMF, and the radio access network device. It may be understood that, to implement the foregoing functions, the LMF, the AMF, or the radio access network device may include a corresponding hardware structure and/or software module for performing each function. A person skilled in the art should be easily aware that, in embodiments of this application, the units and algorithm operations in the examples described with reference to the embodiments disclosed in this specification can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, division into functional unit may be performed on the LMF, the AMF, and the radio access network device based on the foregoing method examples. For example, each functional unit may be obtained through division based on each corresponding function, or two or more functions may be integrated into one unit. The integrated unit may be implemented in a form of hardware, or may be implemented in a form of a software functional unit.

Figure 11:
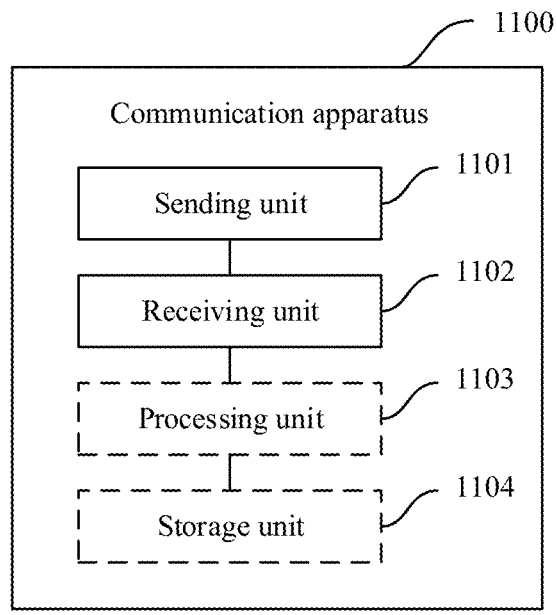
FIG. 11 is a schematic diagram of a communication apparatus according to an embodiment of this application.

Based on the foregoing embodiments, this application further provides a communication apparatus, to implement a function of the LMF, the AMF, or the radio access network device provided in embodiments of this application. As shown in FIG. 11, the communication apparatus 1100 may include a sending unit 1101 and a receiving unit 1102. The communication apparatus 1100 may be the LMF, the AMF, or the radio access network device in any one of the foregoing embodiments. Alternatively, the communication apparatus 1100 may be an apparatus applied to the LMF, the AMF, or the radio access network device in any one of the foregoing embodiments.

In an implementation, the communication apparatus 1100 may further include a processing unit 1103, configured to control and manage an action of the communication apparatus 1100. The communication apparatus 1100 may further include a storage unit 1104, configured to store program code and data of the communication apparatus 1100.

The processing unit 1103 may be a processor or a controller, such as a general-purpose central processing unit (CPU), a general-purpose processor, a digital signal processor (DSP), an application-specific integrated circuit (ASIC), a field programmable gate array (FPGA), or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The storage unit 1104 may be a memory. The sending unit 1101 and the receiving unit 1102 each are an interface circuit of the apparatus, and are configured to receive a signal from another apparatus. For example, when the apparatus is implemented in a form of a chip, the sending unit 1101 is an interface circuit that is of the chip and that is configured to send a signal to another chip or apparatus, or the receiving unit 1102 is an interface circuit that is of the chip and that is configured to receive a signal from another chip or apparatus.

In an embodiment, when the communication apparatus 1100 implements a function of the LMF provided in embodiments of this application, the sending unit is configured to send a first message to an access and mobility management network element, where the first message includes first information associated with a terminal, and the first message indicates to perform location measurement on the terminal. The receiving unit is configured to receive a second message sent by the access and mobility management network element, where the second message includes second information associated with the terminal and location measurement information of the terminal.

In some embodiments, the communication apparatus is applied to a procedure in which the location management function network element and a radio access network device obtain the location measurement information of the terminal.

In some embodiments, the first message is N1/N2 interface communication message transfer signaling, and the second message is N2 interface communication message notification signaling.

In some embodiments, the first message is nonterminal-associated N2 interface communication message transfer signaling, and the second message is nonterminal-associated N2 interface communication message notification signaling.

In some embodiments, before the sending unit sends the first message to the access and mobility management network element, the sending unit is further configured to send a third message to the access and mobility management network element, where the third message is used to subscribe to the location measurement information. The receiving unit is further configured to receive a fourth message sent by the access and mobility management network element, where the fourth message is used to notify that subscription to the location measurement information is successful.

In some embodiments, the third message is N1/N2 interface communication message subscription request signaling, and the fourth message is N1/N2 interface communication message subscription response signaling.

In some embodiments, the third message is nonterminal-associated communication message subscription request signaling, and the fourth message is nonterminal-associated communication message subscription response signaling.

In some embodiments, the third message includes the first information, and the fourth message includes the second information.

In some embodiments, the first information includes a terminal identifier, a routing identifier, a location service correlation identifier, or an N2 interface notification subscription identifier.

In some embodiments, the second information includes a terminal identifier, a routing identifier, a location service correlation identifier, or an N2 interface notification subscription identifier.

In an embodiment, when the communication apparatus 1100 implements a function of the AMF provided in embodiments of this application, the receiving unit is configured to receive a first message sent by a location management function network element, where the first message includes first information associated with a terminal, and the first message indicates to perform location measurement on the terminal. The sending unit is configured to send a fifth message to a radio access network device, where the fifth message includes third information associated with the terminal, and the fifth message indicates to perform location measurement on the terminal. The receiving unit is further configured to receive a sixth message sent by the radio access network device, where the sixth message includes the third information and location measurement information of the terminal. The sending unit is further configured to send a second message to the location management function network element, where the second message includes second information associated with the terminal and the location measurement information.

In some embodiments, the communication apparatus is applied to a procedure in which the location management function network element and the radio access network device obtain the location measurement information of the terminal.

In some embodiments, the first message is N1/N2 interface communication message transfer signaling, and the second message is N2 interface communication message notification signaling.

In some embodiments, the first message is nonterminal-associated N2 interface communication message transfer signaling, and the second message is nonterminal-associated N2 interface communication message notification signaling.

In some embodiments, the fifth message is terminal-associated new radio positioning protocol annex downlink transport signaling, and the sixth message is terminal-associated new radio positioning protocol annex uplink transport signaling.

In some embodiments, the fifth message is nonterminal-associated new radio positioning protocol annex downlink transport signaling, and the sixth message is nonterminal-associated new radio positioning protocol annex uplink transport signaling.

In some embodiments, before the receiving unit receives the first message from the location management function network element, the receiving unit is further configured to receive a third message from the location management function network element, where the fourth message is used to subscribe to the location measurement information. The sending unit is further configured to send a fourth message to the location management function network element, where the fourth message is used to notify that subscription to the location measurement information is successful.

In some embodiments, the third message is N1/N2 interface communication message subscription request signaling, and the fourth message is N1/N2 interface communication message subscription response signaling.

In some embodiments, the third message is nonterminal-associated communication message subscription request signaling, and the fourth message is nonterminal-associated communication message subscription response signaling.

In some embodiments, the third message includes the first information, and the fourth message includes the second information.

In some embodiments, the first information includes a terminal identifier, a routing identifier, a location service correlation identifier, or an N2 interface notification subscription identifier.

In some embodiments, the second information includes a terminal identifier, a routing identifier, a location service correlation identifier, or an N2 interface notification subscription identifier.

In some embodiments, the third information includes a terminal identifier, a routing identifier, a location service correlation identifier, or an N2 interface notification subscription identifier.

In an embodiment, when the communication apparatus 1100 implements a function of the radio access network device provided in embodiments of this application, the receiving unit is configured to receive a fifth message from an access and mobility management network element, where the fifth message includes third information associated with a terminal, and the fifth message indicates to perform location measurement on the terminal. The sending unit is configured to send a sixth message to the access and mobility management network element, where the sixth message includes the third information and location measurement information of the terminal.

In some embodiments, the communication apparatus is applied to a procedure in which a location management function network element and the radio access network device obtain the location measurement information of the terminal.

In some embodiments, the fifth message is terminal-associated new radio positioning protocol annex downlink transport signaling, and the sixth message is terminal-associated new radio positioning protocol annex uplink transport signaling.

In some embodiments, the fifth message is nonterminal-associated new radio positioning protocol annex downlink transport signaling, and the sixth message is nonterminal-associated new radio positioning protocol annex uplink transport signaling.

In some embodiments, the third information includes a subscription permanent identifier, a generic public subscription identifier, a permanent equipment identifier, a routing identifier, a temporary identifier allocated by the location management function network element to the terminal, a temporary identifier allocated by the access and mobility management network element to the terminal, or a temporary identifier allocated by the radio access network device to the terminal.

Figure 12:
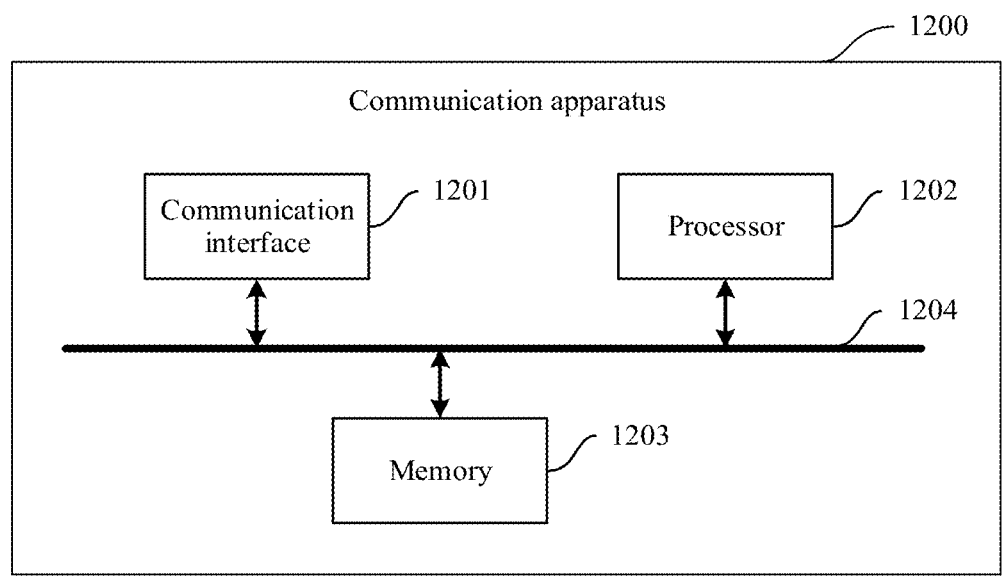
FIG. 12 is a schematic diagram depicting a structure of a communication apparatus according to an embodiment of this application.

Based on the foregoing embodiment, this application further provides a communication apparatus. As shown in FIG. 12, the communication apparatus may be an implementation of a hardware circuit of the communication apparatus shown in FIG. 11. The communication apparatus may be configured to perform functions of the LMF, the AMF, or the radio access network device in the foregoing method embodiments. For ease of description, FIG. 12 merely shows main components of the communication apparatus.

As shown in FIG. 12, the communication apparatus 1200 includes a communication interface 1201, at least one processor 1202, and a memory 1203. The processor 1202 is configured to execute instructions or a program stored in the memory 1203. When the instructions stored in the memory 1203 are executed or the program stored in the memory 1203 is executed, the processor 1202 is configured to perform an operation performed by the processing unit 1103 in the foregoing embodiment, and the communication interface 1201 is configured to perform operations performed by the sending unit 1101 and the receiving unit 1102 in the foregoing embodiment.

The memory 1203 is configured to store program instructions and/or data. The memory 1203 is coupled to the processor 1202. The coupling in this embodiment of this application may be an indirect coupling or a communication connection between apparatuses, units, or modules in an electrical form, a mechanical form, or another form, and is used for information exchange between the apparatuses, the units, or the modules. The processor 1202 may cooperate with the memory 1203. The processor 1202 may execute the program instructions stored in the memory 1203. At least one of the at least one memory may be included in the processor.

In an implementation process, operations in the foregoing methods can be implemented by using a hardware integrated logical circuit in the processor, or by using instructions in a form of software. The operations of the methods disclosed with reference to embodiments of this application may be performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and performs the operations in the foregoing methods in combination with hardware of the processor. To avoid repetition, details are not described herein.

It should be noted that, the processor in embodiments of this application may be an integrated circuit chip, and has a signal processing capability. In an implementation process, operations in the foregoing method embodiments can be implemented by using a hardware integrated logical circuit in the processor, or by using instructions in a form of software. The foregoing processor may be a general-purpose processor, a digital signal processor (DSP), an application-specific integrated circuit (ASIC), a field programmable gate array (FPGA) or another programmable logic device, a discrete gate or transistor logic device, or a discrete hardware component.

It may be understood that the memory in this embodiment of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. It should be noted that the memory of the systems and methods described in this specification includes but is not limited to these and any other proper types of memories.

The communication interface 1201 is configured to communicate with another device by using a transmission medium, so that a component in the communication apparatus 1200 may communicate with the other device. In this embodiment of this application, the communication interface may be a transceiver, a circuit, a bus, a module, or a communication interface of another type. In this embodiment of this application, when the communication interface is the transceiver, the transceiver may include an independent receiver and an independent transmitter, or may be a transceiver integrated with a transceiver function, or may be an interface circuit.

The communication apparatus 1200 may further include a communication line 1204. The communication interface 1201, the processor 1202, and the memory 1203 may be connected to each other by using the communication line 1204. The communication line 1204 may be a peripheral component interconnect (PCI) bus, an extended industry standard architecture (EISA) bus, or the like. The communication line 1204 may be classified into an address bus, a data bus, a control bus, and the like. For ease of representation, only one thick line is used to represent the bus in FIG. 12, but this does not mean that there is only one bus or only one type of bus.

A person skilled in the art should understand that embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a function in one or more processes in the flowcharts and/or in one or more blocks in the block diagrams.

These computer program instructions may alternatively be stored in a computer-readable memory that can instruct a computer or any other programmable data processing device to work in a manner so that the instructions stored in the computer-readable memory generate an artifact that includes an instruction apparatus. The instruction apparatus implements a function in one or more processes in the flowcharts and/or in one or more blocks in the block diagrams.

It is clearly that, a person skilled in the art can make various modifications and variations to this application without departing from the scope of this application. This application is intended to cover these modifications and variations of this application provided that they fall within the scope of protection defined by the following claims and their equivalent technologies.

The invention claimed is:

1. A communication method, performed by a location management function network element and comprising:
   sending a first message to an access and mobility management function network element, wherein the first message comprises first information associated with a terminal, and the first message indicates to perform location measurement on the terminal; and
   receiving a second message from the access and mobility management function network element, wherein the second message comprises second information associated with the terminal and location measurement information of the terminal, wherein the first message comprises nonterminal-associated N2 interface communication message transport signaling, and the second message comprises nonterminal-associated N2 interface communication message notification signaling.

2. The method according to claim 1, wherein the method is applied to a procedure in which the location management function network element and a radio access network device obtain the location measurement information of the terminal.

3. The method according to claim 1, wherein the method further comprises:
   prior to the sending the first message to the access and mobility management function network element, sending a third message to the access and mobility management function network element, wherein the third message is used to subscribe to the location measurement information; and
   receiving a fourth message from the access and mobility management function network element, wherein the fourth message is used to notify that subscription to the location measurement information is successful.

4. The method according to claim 3, wherein the third message comprises N1/N2 interface communication message subscription request signaling, and the fourth message comprises N1/N2 interface communication message subscription response signaling.

5. The method according to claim 4, wherein the third message comprises the first information, and the fourth message comprises the second information.

6. The method according to claim 3, wherein the third message comprises nonterminal-associated communication message subscription request signaling, and the fourth message comprises nonterminal-associated communication message subscription response signaling.

7. The method according to claim 1, wherein the first information comprises a terminal identifier, a routing identifier, a location service correlation identifier, or an N2 interface notification subscription identifier.

8. The method according to claim 1, wherein the second information comprises a terminal identifier, a routing identifier, a location service correlation identifier, or an N2 interface notification subscription identifier.

9. An apparatus, comprising:
   a processor and a memory, wherein the memory is configured to store a computer program, and the processor is configured to execute the computer program stored in the memory, wherein the computer program instructs the processor to:
   send a first message to an access and mobility management function network element, wherein the first message comprises first information associated with a terminal, and the first message indicates to perform location measurement on the terminal; and
   receive a second message from the access and mobility management function network element, wherein the second message comprises second information associated with the terminal and location measurement information of the terminal, wherein the first message comprises nonterminal-associated N2 interface communication message transport signaling, and the second message comprises nonterminal-associated N2 interface communication message notification signaling.

10. The apparatus according to claim 9, wherein the computer program instructs the processor to apply to a procedure in which location management function network element and radio access network device obtain the location measurement information of the terminal.

11. The apparatus according to claim 9, wherein the computer program further instructs the processor to:
    prior to the first message being sent to the access and mobility management function network element, send a third message to the access and mobility management function network element, wherein the third message is used to subscribe to the location measurement information; and
    receive a fourth message from the access and mobility management function network element, wherein the fourth message is used to notify that subscription to the location measurement information is successful.

12. The apparatus according to claim 11, wherein the third message comprises N1/N2 interface communication message subscription request signaling, and the fourth message comprises N1/N2 interface communication message subscription response signaling.

13. The apparatus according to claim 12, wherein the third message comprises the first information, and the fourth message comprises the second information.

14. The apparatus according to claim 11, wherein the third message comprises nonterminal-associated communication message subscription request signaling, and the fourth message comprises nonterminal-associated communication message subscription response signaling.

15. The apparatus according to claim 9, wherein the first information comprises a terminal identifier, a routing identifier, a location service correlation identifier, or an N2 interface notification subscription identifier.

16. The apparatus according to claim 9, wherein the second information comprises a terminal identifier, a routing identifier, a location service correlation identifier, or an N2 interface notification subscription identifier.

17. A communication method, performed by a location management function network element and comprising:

sending a first message to an access and mobility management function network element, wherein the first message comprises first information associated with a terminal, and the first message indicates to perform location measurement on the terminal; and receiving a second message from the access and mobility management function network element, wherein the second message comprises second information associated with the terminal and location measurement information of the terminal, wherein prior to the sending the first message to the access and mobility management function network element, sending a third message to the access and mobility management function network element, wherein the third message is used to subscribe to the location measurement information; and receiving a fourth message from the access and mobility management function network element, wherein the fourth message is used to notify that subscription to the location measurement information is successful.

18. The method according to claim 17, wherein the third message comprises N1/N2 interface communication message subscription request signaling, and the fourth message comprises N1/N2 interface communication message subscription response signaling.

19. The method according to claim 18, wherein the third message comprises the first information, and the fourth message comprises the second information.

20. The method according to claim 17, wherein the third message comprises nonterminal-associated communication message subscription request signaling, and the fourth message comprises nonterminal-associated communication message subscription response signaling.

\* \* \* \* \*